US012626519B2

(12) United States Patent
Sapra et al.

(10) Patent No.: US 12,626,519 B2
(45) Date of Patent: May 12, 2026

(54) FEATURE DETECTION USING LANGUAGE MODELS

(71) Applicant: NVIDIA Corporation, Santa Clara, CA (US)

(72) Inventors: Karan Sapra, San Jose, CA (US); Yu Zhang, Sunnyvale, CA (US); Yangdongfang Yang, Madison, WI (US); Yixuan Lin, San Jose, CA (US); Ge Cong, Pleasanton, CA (US); Andrew Tao, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 144 days.

(21) Appl. No.: 18/442,494

(22) Filed: Feb. 15, 2024

(65) Prior Publication Data

US 2025/0265848 A1 Aug. 21, 2025

(51) Int. Cl.
*G06V 20/58* (2022.01)
*B60W 60/00* (2020.01)
(Continued)

(52) U.S. Cl.
CPC ......... *G06V 20/588* (2022.01); *B60W 60/001* (2020.02); *G01C 21/3815* (2020.08);
(Continued)

(58) Field of Classification Search
CPC .............. G06V 20/588; B60W 60/001; B60W 2556/05; B60W 2556/40; G01C 21/3815; G06F 40/284
See application file for complete search history.

(56) References Cited

U.S. PATENT DOCUMENTS 10,859,395 B2 12/2020 Wheeler et al.
11,738,770 B2 8/2023 Han et al.
(Continued)

OTHER PUBLICATIONS

Can, et al.; "Structured Bird's-eye-view Traffic Scene Understanding from Onboard Images," 2021 IEEE/CVF International Conference on Computer Vision (ICCV), pp. 15641-15650, 2021.
(Continued)

*Primary Examiner* — Joan T Goodbody
*Assistant Examiner* — Godfrey Aleksander Maciorowski
(74) *Attorney, Agent, or Firm* — IRON SUMMIT IP LLP

(57) ABSTRACT

In various examples, feature identification using language models for autonomous and semi-autonomous systems and applications is described herein. Systems and methods described herein may use a language model(s) to determine information associated with features, such as surface markings, within an environment. For example, sensor data may be used to generate one or more images or other sensor data representations corresponding to an environment. The image(s) may then be processed to generate input data (e.g., input tokens) that is applied to the language model(s). Based at least on processing the input data, the language model(s) may be trained to output data (e.g., output tokens) representing information associated with one or more features. Additionally, the output data may be used to determine the information associated the feature(s) within the environment, where the information may then be used to update a map and/or navigate one or more machines within the environment.

20 Claims, 22 Drawing Sheets

100

(51) Int. Cl.
  *G01C 21/00*     (2006.01)
  *G06F 40/284*   (2020.01)
  *G06V 20/56*    (2022.01)
(52) U.S. Cl.
  CPC ....... *G06F 40/284* (2020.01); *B60W 2556/05* (2020.02); *B60W 2556/40* (2020.02)

(56) References Cited

U.S. PATENT DOCUMENTS

| | | | |
|---|---|---|---|
| 11,921,502 B2 | 3/2024 | Park et al. | |
| 2020/0250901 A1* | 8/2020 | Golov | B60R 21/0134 |
| 2020/0393265 A1 | 12/2020 | Piao et al. | |
| 2021/0366123 A1* | 11/2021 | Wang | G06T 7/149 |
| 2023/0089742 A1* | 3/2023 | Sun | G06V 20/584 |
| | | | 701/55 |
| 2023/0214654 A1 | 7/2023 | Piao et al. | |
| 2024/0160853 A1* | 5/2024 | Li | G06N 3/044 |

OTHER PUBLICATIONS

Loshchilov, et al.; "Decoupled Weight Decay Regularization," https://arxiv.org/abs/1711.05101, Jan. 4, 2019, 19 pgs.
Alvarez, Jose, M.; "Road Detection Based on Illuminant Invariance," IEEE Transactions on Intelligent Transportation Systems; 2010, 11 pgs.
Batra, Anil, et al.; "Improved Road Connectivity by Joint Learning of Orientation and Segmentation," CVPR, 2019, 9 pgs.
Can, et al.; "Topology Preserving Local Road Network Estimation from Single Onboard Camera Image," https://arxiv.org/abs/2112.10155; Mar. 20, 2022, 18 pgs.
Chen, et al.; "PersFormer: 3D Lane Detection via Perspective Transformer and the Openlane Benchmark," https://arxiv.org/abs/2203.11089; Jul. 19, 2022, 33 pgs.
Chu, et al.; "Neural Turtle Graphics for Modeling City Road Layouts," https://arxiv.org/abs/1910.02055; Oct. 4, 2019, 9 pgs.
Garnett, et al.; "3D-Lanenet: End-to-End 3D Multiple Lane Detection," https://arxiv.org/abs/1811.10203; Sep. 10, 2019, 14 pgs.
Guo, et al.; "Gen-LaneNet: A Generalized and Scalable Approach for 3D Lane Detection," https://arxiv.org/abs/2003.10656; Mar. 24, 2020, 14 pgs.
He, et al.; "Lane-Level Street Map Extraction from Aerial Imagery," CVF 2022; 10 pgs.
He, et al.; "Sat2Graph: Road Graph Extraction Through Graph-Tensor Encoding," https://arxiv.org/abs/2007.09547; Jul. 19, 2020, 17 pgs.
Homayounfar, et al.; "DAGMapper: Learning to Map by Discovering Lane Topology," https://arxiv.org/abs/2012.12377; Dec. 22, 2020, 19 pgs.
Li; et al.; "Graph-Based Topology Reasoning for Driving Scenes," https://arxiv.org/abs/2304.05277; Aug. 28, 2023, 12 pgs.
Paz, et al.; "A Variational Approach to Online Road and Path Segmentation with Monocular Vision," ICRA, 2015, 7 pgs.
Tan, et al.; "Color Model-Based Real-Time Learning tor Road Following," IEEE ITS, 2006, 6 pgs.
Wang, et al.; "OpenLane-v2: A Topology Reasoning Benchmark for Scene Understanding in Autonomous Driving," arXiv:2304.10440, 2023, 12 pgs.
Wu, et al.; "TopoMLP: A Simple Yet Strong Pipeline for Driving Topology Reasoning," https://arxiv.org/abs/2310.06753; Nov. 1, 2023, 12 pgs.
Xu, et al.; "CenterLineDet: Road Lane Certerline Graph Detection with Vehicle-Mounted Sensors by Transformer for High-Definition Map Creation," https://arxiv.org/abs/2209.07734; Feb. 28, 2023, 7 pgs.

* cited by examiner

INTENSITY IMAGE
302

COLOR IMAGE
308

HEIGHT IMAGE
310

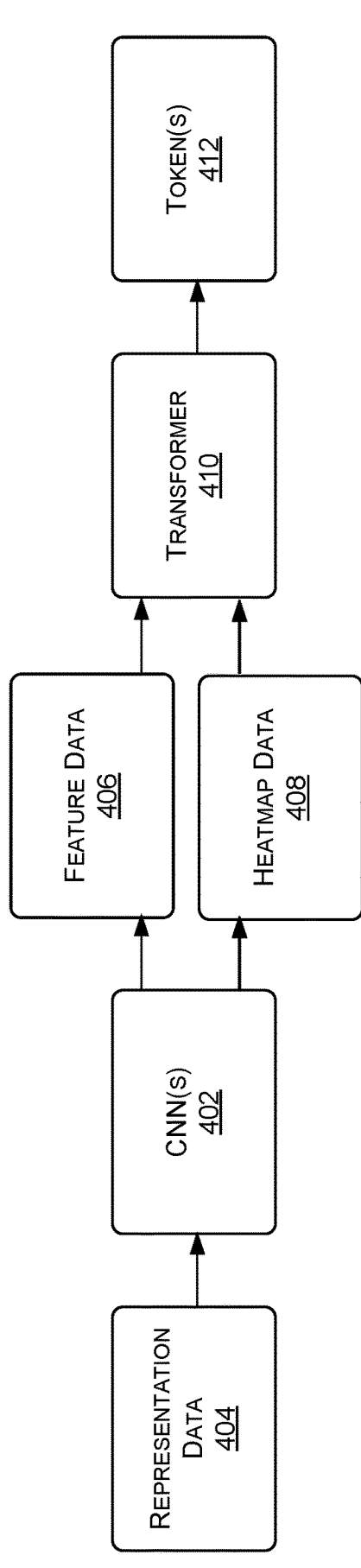
FIGURE 4

INFORMATION
602

POINT
604(1)

INFORMATION 602

POINT 604(1)
POINT 604(2)
POINT 604(3)
POINT 604(4)
POINT 604(5)
POINT 604(6)
POINT 604(7)
POINT 604(8)

LINE 606(1)
LINE 606(2)
LINE 606(3)
LINE 606(4)
LINE 606(5)
LINE 606(6)
LINE 606(7)

900

GENERATE, BASED AT LEAST ON SENSOR DATA, ONE OR MORE
REPRESENTATIONS CORRESPONDING TO AN ENVIRONMENT
B902

GENERATE, BASED AT LEAST ON THE ONE OR MORE THE
REPRESENTATIONS , ONE OR MORE INPUT TOKENS REPRESENTATIVE OF
ONE OR MORE ROAD LINES ASSOCIATED WITH THE ENVIRONMENT
B904

GENERATE, BASED AT LEAST ON ONE OR MORE LANGUAGE MODELS
PROCESSING THE ONE OR MORE INPUT TOKENS, ONE OR MORE OUTPUT
TOKENS REPRESENTATIVE OF ONE OR MORE ATTRIBUTES ASSOCIATED
WITH THE ONE OR MORE ROAD LINES
B906

DETERMINE, BASED AT LEAST ON THE ONE OR MORE OUTPUT TOKENS,
ONE OR MORE LOCATIONS ASSOCIATED WITH THE ONE OR MORE ROAD
LINES WITHIN THE ENVIRONMENT
B908

FIGURE 9

1000

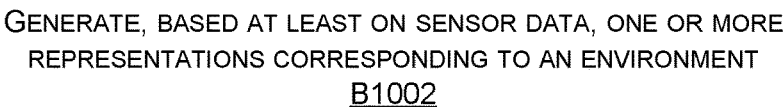

GENERATE, BASED AT LEAST ON SENSOR DATA, ONE OR MORE
REPRESENTATIONS CORRESPONDING TO AN ENVIRONMENT
B1002

GENERATE, BASED AT LEAST ON THE ONE OR MORE THE
REPRESENTATIONS , INPUT DATA CORRESPONDING TO ONE OR MORE
FEATURES ASSOCIATED WITH THE ENVIRONMENT
B1004

GENERATE, BASED AT LEAST ON ONE OR MORE LANGUAGE MODELS
PROCESSING THE INPUT DATA, OUTPUT DATA REPRESENTATIVE OF ONE
OR MORE ATTRIBUTES ASSOCIATED WITH THE ONE OR MORE FEATURES
B1006

DETERMINE, BASED AT LEAST ON THE OUTPUT DATA, INFORMATION
ASSOCIATED WITH THE ONE OR MORE FEATURES
B1008

MEMORY
1204

I/O COMPONENTS
1214

CPU(S)
1206

POWER SUPPLY
1216

GPU(S)
1208

PRESENTATION
COMPONENT(S)
1218

COMM. INTERFACE
1210

LOGIC UNIT(S)
1220

I/O PORT(S)
1212

1202

1300

FEATURE DETECTION USING LANGUAGE MODELS

BACKGROUND

For vehicles (e.g., autonomous vehicle, semi-autonomous vehicles, robots, etc.) to operate safely in environments, the vehicles must be capable of effectively performing a variety of vehicle maneuvers—such as lane keeping, lane changing, lane splits, turns, stopping and starting at intersections, crosswalks, and the like. For example, for a vehicle to navigate through surface streets (e.g., city streets, side streets, neighborhood streets, etc.) and on highways (e.g., multi-lane roads), the vehicle is required to navigate among one or more divisions or demarcations (e.g., lanes, intersections, crosswalks, boundaries, etc.) of a road that are often marked using road markings, such as road lines. As such, it is important that the vehicles are able to detect the road markings within the environments, such that the vehicles are able to determine how to navigate according to rules associated with the road markings.

To detect road markings, vehicles may, at least in part, use maps corresponding to the environments for which the vehicles are navigating. For example, the maps may indicate the locations of important features that the vehicles need to identify when navigating, such as road surfaces and road markings. Conventional approaches for determining the locations of road marking for these maps include using convolutional neural networks to process image data generated using image sensors of vehicles that have navigated within the environments. For instance, the image data may represent images depicting the road markings within the environments. As such, the systems are able to process the image data, such as by using one or more image processing techniques (e.g., object detection, object recognition, etc.) that use the convolutional neural networks, to detect the locations of the road markings within the images. The systems may then use the locations of the road markings from the images to determine the corresponding locations of the road markings within the maps.

While these systems are able to determine the locations of the road markings within the environments using convolutional neural networks, there may be room for improving the accuracy and precision of these systems. As such, techniques for increasing the accuracy and precision of the results for the locations of the of road markings may provide for better maps for the vehicles, which may also improve the driving capabilities of the vehicles.

SUMMARY

Embodiments of the present disclosure relate to feature identification using language models for autonomous and semi-autonomous systems and applications. For instance, systems and methods described herein may use one or more language models—such as large language models (LLMs)—to determine information associated with features, such as road markings (e.g., lane lines, road boundary lines, crosswalk lines, yield lines, bike lane lines, etc.), within an environment. For example, sensor data (e.g., image data, LiDAR data, RADAR data, ultrasonic data, etc.) may be used to generate one or more images (or other sensor data representations, such as point clouds) corresponding to an environment, such as an intensity image, a color image, and/or a height image. The image(s) may then be processed to generate input data (e.g., a tokenized representation of feature information) that is applied to—e.g., processed by— the language model(s). Based at least on processing the input data, the language model(s) may be trained to output data (e.g., a tokenized representation of feature or attribute information corresponding to the input data) representing one or more attributes associated with one or more features. For instance, the output data may represent locations, colors, types, shapes, orientations, and/or any other attribute associated with the feature(s). As such, the output data may be used to determine the information associated the feature(s) within the environment, where the information may then be used to update a map of the environment and/or to navigate one or more machines within the environment. As such, the processes described herein may be used for offline map building or updates, and/or may be used in deployment to aid in navigation or control of one or more autonomous or semi-autonomous machines.

In contrast to conventional systems, the systems described herein, in some embodiments, are able to more precisely and accurately determine information associated with features, such as road markings, within environments. This is because the current systems may use a language model(s)—and more specifically a language model(s) that is trained to determine attributes associated with such features—to determine the information associated with the features, which may be more accurate than using a convolutional neural network (CNN) alone for image processing. For instance, the accuracy of the language model(s) may be increased based at least on training the language model(s) using specific types of inputs, such tokenized representations of detected feature information, such that the language model(s) is able to generate specific types of outputs, such as tokenized representations associated with various attributes corresponding the detected features. These outputs, which may be more accurate and precise as compared to outputs from CNN-only techniques, may then be used to determine the information associated with the features.

BRIEF DESCRIPTION OF THE DRAWINGS

The present systems and methods for feature identification using language models for autonomous and semi-autonomous systems and applications are described in detail below with reference to the attached drawing figures, wherein:

FIG. 4 illustrates an example of using one or more models to generate input data for one or more language models, in accordance with some embodiments of the present disclosure;

FIG. 9 illustrates a flow diagram showing a method for determining locations of road lines using one or more language models, in accordance with some embodiments of the present disclosure;

FIG. 10 illustrates a flow diagram showing a method for determining information associated with features located within an environment using one or more language models, in accordance with some embodiments of the present disclosure;

DETAILED DESCRIPTION

Figure 1:
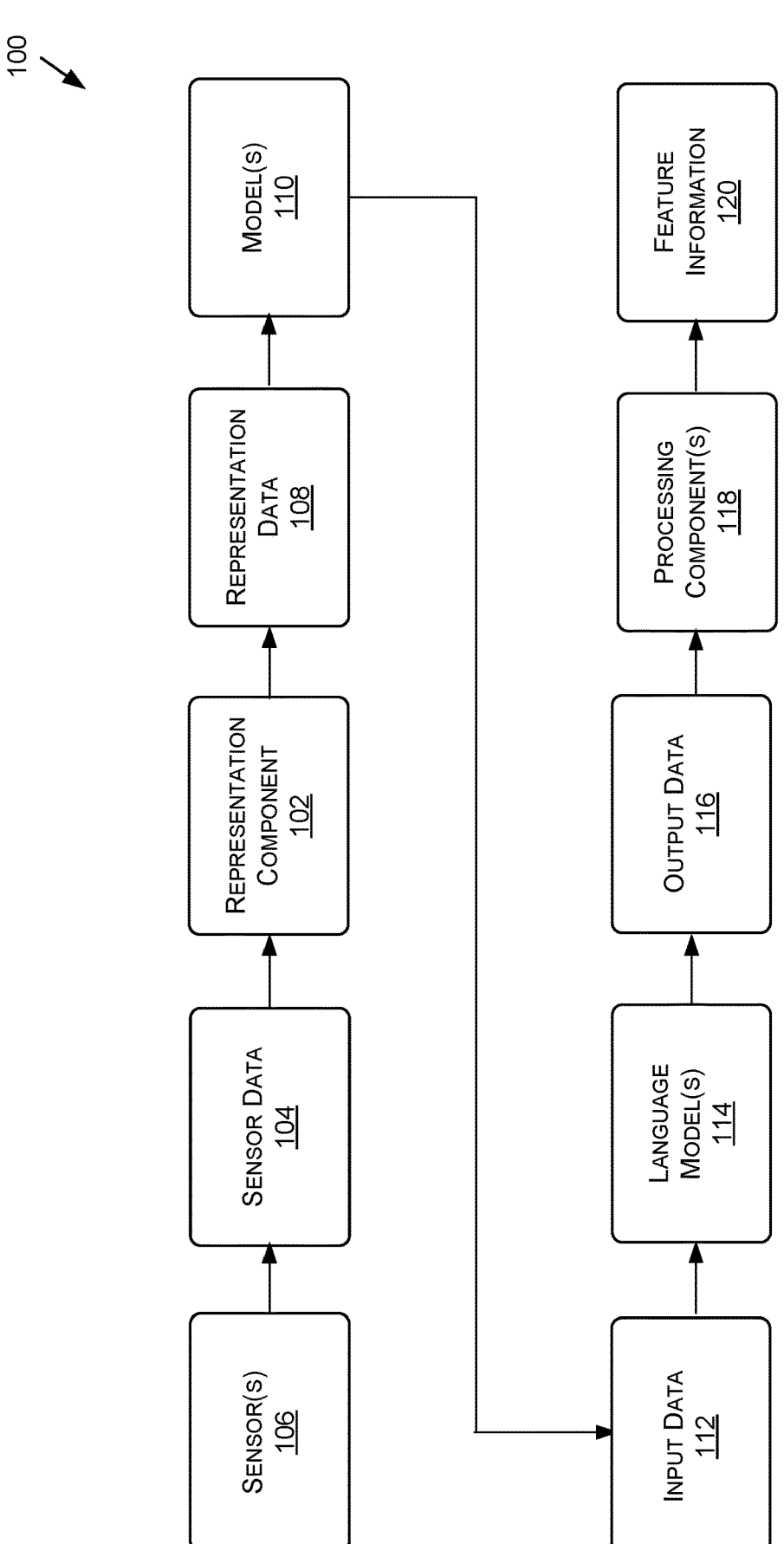
FIG. 1 illustrates an example data flow diagram for a process of feature identification using one or more language models, in accordance with some embodiments of the present disclosure.

Systems and methods are disclosed related to feature identification using language models for autonomous and semi-autonomous systems and applications. Although the present disclosure may be described with respect to an example autonomous or semi-autonomous vehicle or machine 1100 (alternatively referred to herein as "vehicle 1100," "ego-vehicle 1100," "ego-machine 1100," or "machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to feature detection in autonomous or semi-autonomous applications, this is not intended to be limiting, and the systems and methods described herein may be used in augmented reality, virtual reality, mixed reality, robotics, security and surveillance, autonomous or semi-autonomous machine applications, simulation applications, and/or any other technology spaces where object or feature detection and/or map creation may be used.

For instance, a system(s) may receive sensor data generated using one or more sensors of one or more machines navigating within an environment. As described herein, the sensor data may include, but is not limited to, LiDAR data generated using one or more LiDAR sensors, image data generated using one or more image sensors (e.g., one or more cameras), RADAR data generated using one or more RADAR sensors, ultrasonic data generated using one or more ultrasonic sensors, and/or any other type of sensor data generated using any other type of sensor modality. The system(s) may then be configured to generate one or more images or other senor data representations (e.g., point clouds) associated with the environment using the sensor data. As described herein, the image(s) may include, but is not limited to, an intensity image (e.g., a LiDAR intensity image), a range image, a projection image, a perspective image, a color image, a height image, a top-down image (or bird's-eye-view (BEV)) image, and/or any other type of image or sensor data representation associated with the environment. In some examples, the image(s) may be captured from a specific perspective, and/or may be converted or translated to a different perspective, such that the image used within the process corresponds to a desired view or perspective—such as perspective, top-down, BEV, etc.

The system(s) may then process image data representing the image(s) and, based at least on the processing, generate input data, such as one or more input tokens. For example, and as described herein, the system(s) may process the image data using one or more machine learning models, one or more neural networks, one or more transformers, one or more components, one or more modules, and/or the like that are trained to generate the input data based at least on the sensor data. The system(s) may then apply the input data (e.g., in a tokenized format) to one or more language models (e.g., one or more large language models, etc.) that are trained to determine one or more attributes, characteristics, etc. associated with one or more features located within the environment. For example, if the feature(s) includes a road or other surface line, then the attribute(s) or characteristic(s) may include, but is not limited to, one or more locations associated with the road line, one or more colors associated with the road line, one or more types associated with the road line, one or more shapes associated with the road lines, and/or any other type of attribute associated with the road or surface line.

For instance, the language model(s) may be trained to generate output data, such as a tokenized representation, corresponding to different points associated with a feature. For example, if the feature again includes a road line, then the output data may include a first set of tokens associated with a first point on the road line, a second set of tokens associated with a second point on the road line, a third set of tokens associated with a third point on the road line, and/or so forth. Additionally, and with regard to a set of tokens, a first token may indicate a location of a point (e.g., the x-coordinate, the y-coordinate, and/or the z-coordinate), a second token may indicate a class of point (e.g., a starting point indicating a start of a line segment, an intermediary point indicating a point that is not a start or end of a line segment, an ending point indicating a point that is at an end of a line segment, etc.), a third token may indicate a type of road line (e.g., solid, dashed, double, etc.), a fourth token may indicate a color of road line (e.g., white, yellow, green, orange, etc.), a fifth token may indicate a shape of road line (e.g., straight, curved, etc.), and/or one or more additional tokens may indicate one or more additional attributes or characteristics associated with road lines. The system(s) may then use the output data—e.g., by converting the tokenized representation back to image space, sensor space, and/or world-space to determine information associated with the feature, such as the location, type, color, shape, orientation, and/or the like.

For instance, if the output data is again associated with a road line, then the system(s) may use a first portion of the output data (e.g., a first set of tokens) to determine information associated with a first point of the road line. For example, the first portion of the output data may indicate at least a first location of the first point, that the first point includes a starting point, a type of the road line at the first location, a color of the road line at the first point, and a shape of the road line at the first point. The system(s) may then use a second portion of the output data (e.g., a second set of tokens) to determine information associated with a second point of the road line. For example, the second portion of the output data may indicate at least a second location of the second point, that the second point includes an intermediary point, the type of the road line at the second location, the color of the road line at the second point, and the shape of the road line at the second point. In some examples, the language model(s) generates the second portion of the output data after the first portion of the output data (e.g., in sequence) such that the second point is after the first point along the road line. As such, the system(s) may connect the second point to the first point using a line that includes the type associated with the second point, the color associated with the second point, and/or the shape associated with the second point.

The system(s) may then continue to perform these processes to continue generating the road line as the output data continues to indicate additional intermediary points associated with the road line. For instance, the system(s) may continue these processes until processing a final portion of the output data that indicates a final point of the road line. For example, the final portion of the output data may indicate at least a final location of the final point, that the final point includes an ending point, the type of the road line at the final location, the color of the road line at the final point, and the shape of the road line at the final point. The system(s) may then perform the processes described herein to connect the final point to the previous intermediary point such that an entirety of the line now represents the road line from the starting point to the ending point. Additionally, the system(s) may perform similar processes for one or more additional road lines and/or other types of features located within the environment.

The system(s) may then cause one or more operations to occur based at least on the generated information associated with the feature(s). For a first example, such as if the feature(s) includes a road line(s), the system(s) may update a map to indicate the location(s), the type(s), the color(s), and/or the shape(s) of the road line(s). For a second example, such as if the system(s) is associated with a machine navigating within the environment, and the feature(s) again includes a road line(s), the system(s) may cause the machine to navigate based at least on the location(s), the type(s), the color(s), and/or the shape(s) associated with the road line(s).

In some examples, the system(s) (and/or another system(s)) may train the language model(s) to perform one or more of the processes described herein. For instance, the system(s) may use training sensor data to generate training images or other sensor data representations, where the training images may include intensity images, color images, height images, etc. The system(s) may then process training image data representing the training images in order to generate training input data. For example, the system(s) may process the training image data using the one or more machine learning models, the one or more neural networks, the one or more transformers, the one or more components, the one or more modules, and/or the like that are trained to generate the training input data based at least on the training image data. As described herein, the training input data may also include input tokens. The system(s) may then apply to the training input data to the language model(s) and, based at least on applying the training input data, receive training output data from the language model(s). As described herein, the training output data may represent attributes associated with features represented by the training image data. For example, the training output data may represent output tokens associated with the attributes.

The system(s) (e.g., a training engine) may then compare the training output data to ground truth data that represents ground truth attributes associated with the features. For example, the ground truth data may represent ground truth tokens associated with the ground truth attributes. In some examples, the system(s) generates the ground truth tokens by processing one or more ground truth images indicating the ground truth locations, types, colors, and/or shapes of the features. Based at least on comparing the training output data to the ground truth output data, the system(s) may then update the language model(s). For example, the system(s) may determine one or more losses based at least on comparing the training output data to the ground truth output data and then use the loss(es) to update the parameters and/or weights of the language model(s).

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of feature identification using language models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include a representation component 102 receiving sensor data 104 generated using one or more sensors 106 of one or more machines (e.g., one or more autonomous vehicles 1100). As described herein, the sensor data 104 may include, but is not limited to, LiDAR data generated using one or more LiDAR sensors, image data generated using one or more image sensors (e.g., one or more cameras), RADAR data generated using one or more RADAR sensors, and/or any other type of sensor data generated using any other type of sensor. In some examples, the sensor data 104 may be generated using one or more machines that previously navigated within an environment, such as when the process 100 is associated with updating a map (which is described with respect to FIG. 7A). In some examples, the sensor data 104 may be generated by a machine that is currently navigating within the environment, such as when the process 100 is associated with navigating the machine (which is described with respect to FIG. 7B). In any example, the sensor data 104 may represent the environment, such as features located within the environment. As described herein, a feature may include, but is not limited to, a road feature (e.g., a road marking, such as a road line, a road, a traffic sign, a traffic signal, etc.), a structure (e.g., a building, etc.), an object (e.g., a traffic sign, a pole, a traffic light, a warehouse object, etc.) a vehicle, a pedestrian, and/or any other type of object or feature that may be located within the environment.

Figure 2:
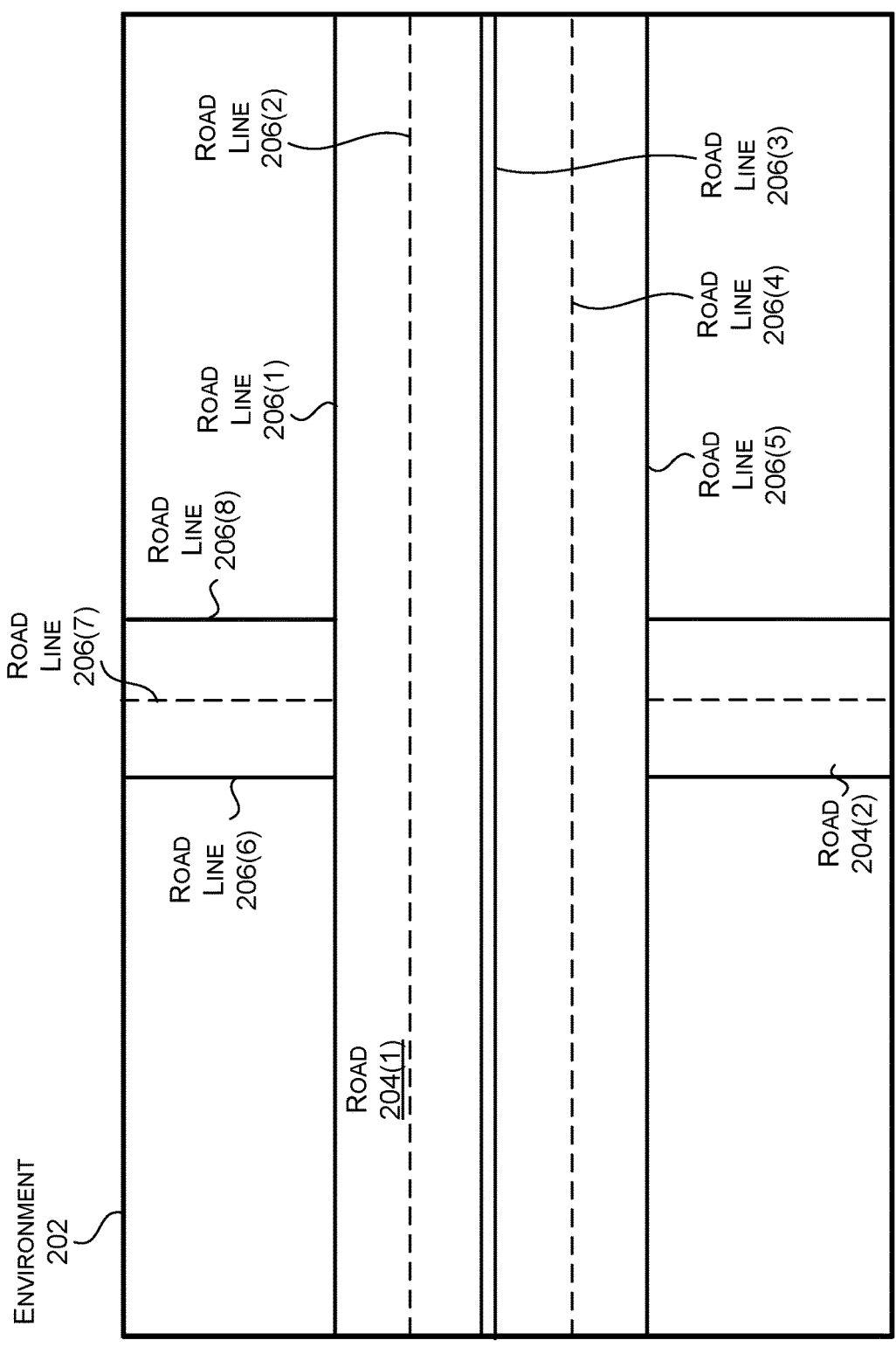
FIG. 2 illustrates an example of an environment that includes features, in accordance with some embodiments of the present disclosure.

For instance, FIG. 2 illustrates an example of an environment 202 that includes features, in accordance with some embodiments of the present disclosure. As shown, the environment 202 includes at least a first road 204(1) and a second road 204(2), where the first road 204(1) is at least partially located over the second road 204(2) (e.g., the first road 204(1) includes an overpass). The first road 204(1) also includes at least road lines 206(1)-(5) while the second road 204(2) includes road lines 206(6)-(8). In some examples, the roads 204(1)-(2) (which may also be referred to singularly as "road 204" or in plural as "road 204") and/or the road lines 206(1)-(8) (which may also be referred to singularly as "road line 206" or in plural as "road lines 206") may also be referred to as "features" of the environment 202. Additionally, while the environment 202 in the example of FIG. 2 is only illustrated as including the roads 204 and the road lines 206, in other examples, the environment 202 may include additional and/or alternative features (e.g., road signs, road signals, other road markings, structures, vehicles, pedestrians, etc.).

Referring back to the example of FIG. 1, the process 100 may include the representation component 102 using at least a portion of the sensor data 104 to generate representation data 108 that represents one or more representations associated with the environment. As described herein, in some examples, the representation(s) may include one or more images, such as an intensity image, a color image, a height image, and/or one or more other representations (e.g., point clouds) depicting or otherwise corresponding to information associated with the environment. Additionally, in examples where the representation(s) includes the image(s), the image(s) may include a top-down image(s) (e.g., a birds-eye-view image(s)) of the environment, a perspective view of the environment, and/or another perspective or view depending on the particular embodiment.

For example, such as when the sensor data 104 includes at least LiDAR data, the LiDAR data (and/or a point cloud associated with the LiDAR data) may represent intensities associated with at least a portion of the points within the environment. For instance, and as described herein, the LiDAR sensor(s) used to generate the LiDAR data may measure the intensities of the points at the time the light returns back to the LiDAR sensor(s). In some examples, the intensities may be represented using a number, such as a number between 0 and 256 (although other ranges may be used in other examples), where the number various based on the composition (e.g., color, texture, material, etc.) of the surface for which the light reflected. For example, a low number may indicate a low reflectivity while a high number indicates a high reflectivity. In some examples, the intensity may depend on other factors, such as the angles of arrival, the ranges of the points, moisture content, and/or the like.

As such, the representation component 102 may process the LiDAR data in order to generate one or more intensity images using the intensities of the points, wherein an intensity image represents the surfaces for which the light reflected within environment. For example, the image(s) may include a top-down (BEV) image(s) representing at least one or more surfaces within the environment. In such examples, and described herein, since the intensities of the points may vary based on one or more factors, such as the colors of the surfaces associated with the points (e.g., the colors of the surfaces for which the light reflected), the image(s) may indicate the structure of the road lines.

Additionally, in some examples, such as when the sensor data 104 further includes image data, the representation component 102 may use the image data to determine color information associated with various points represented by the LiDAR data. The representation component 102 may then use the point locations from the LiDAR data, along with the color information, to generate one or more color images associated with the environment. Furthermore, in some examples, the representation component 102 may use sensor data 104 representing distances to various points within the environment, such as LiDAR data, RADAR data, image data, and/or the like, to determine height information associated with points within the environment. The representation component 102 may then use the height information to generate one or more height images associated with the environment.

Figure 3A:
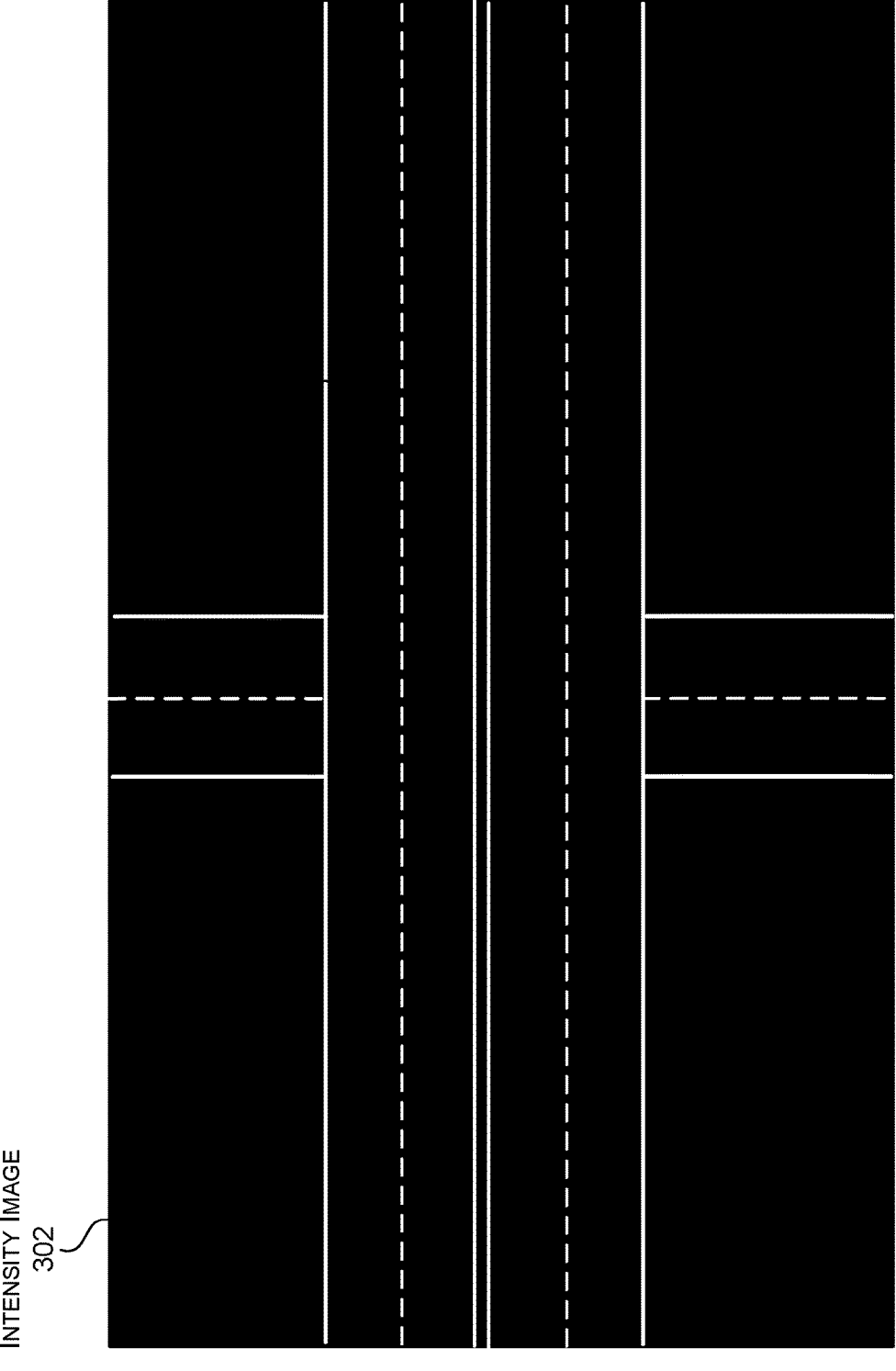
FIGS. 3A-3C illustrate examples of images that may be used for identifying information associated with features located within an environment, in accordance with some embodiments with the present disclosure.
Figure 3B:
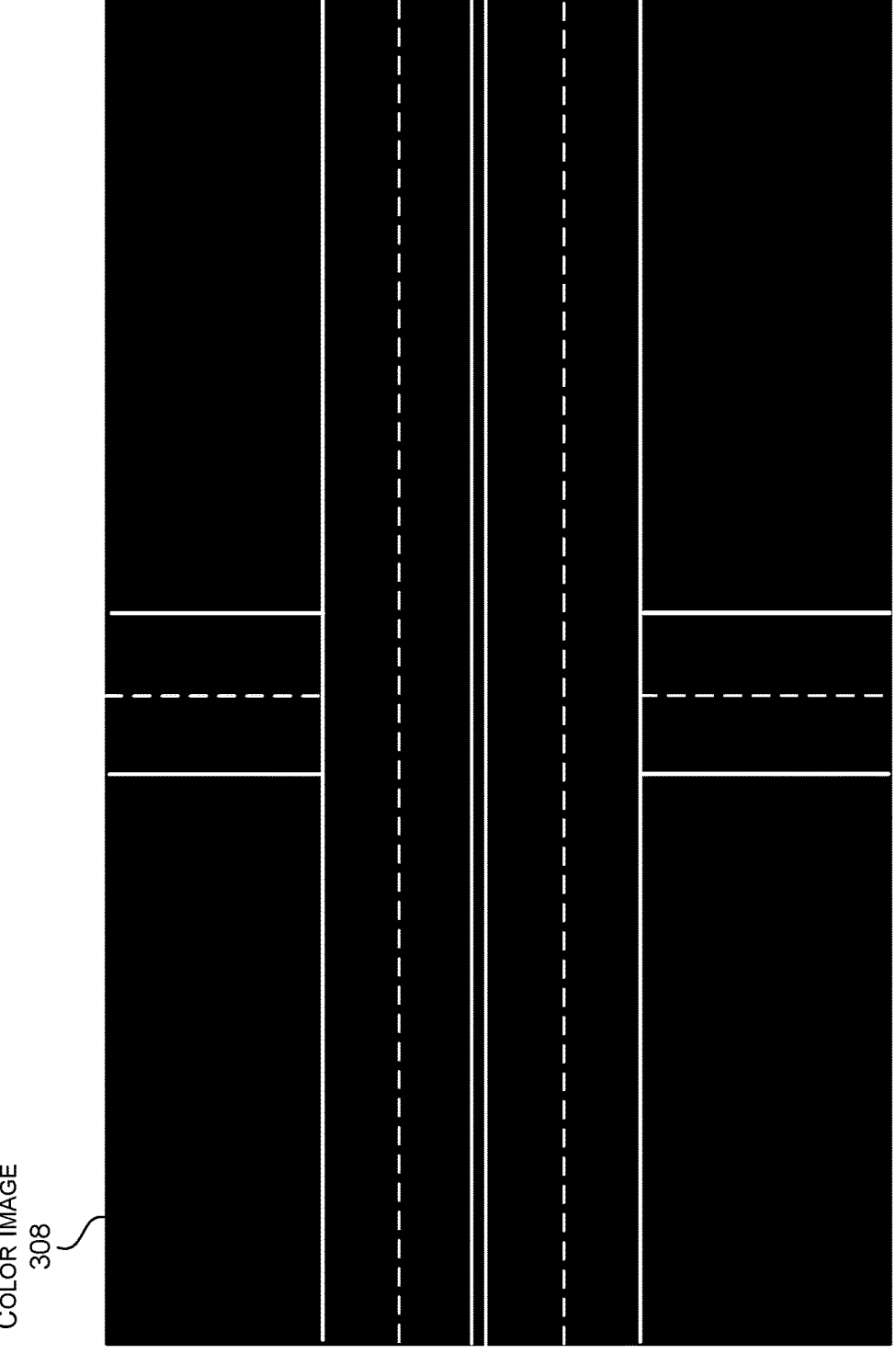

For instance, FIGS. 3A-3B illustrate examples of images that may be used for identifying information associated with features located within the environment 202, in accordance with some embodiments with the present disclosure. As shown by the example of FIG. 3A, the representation component 102 may generate an intensity image 302 associated with the environment 202. In some examples, since intensities 304 (although only one is labeled for clarity reasons) for points associated with the road lines 206 within the environment 202 may be different than intensities 306 (although only one is again labeled for clarity reasons) for points associated with other portions of the environment 202, the intensity image 302 may indicate the locations associated with the road lines 206 within the environment 202. For instance, the points of the intensity image 302 that are associated with the road lines 206 within the environment 202 may include a different color as compared to the points associated with other portions of the environment 202.

Figure 3C:
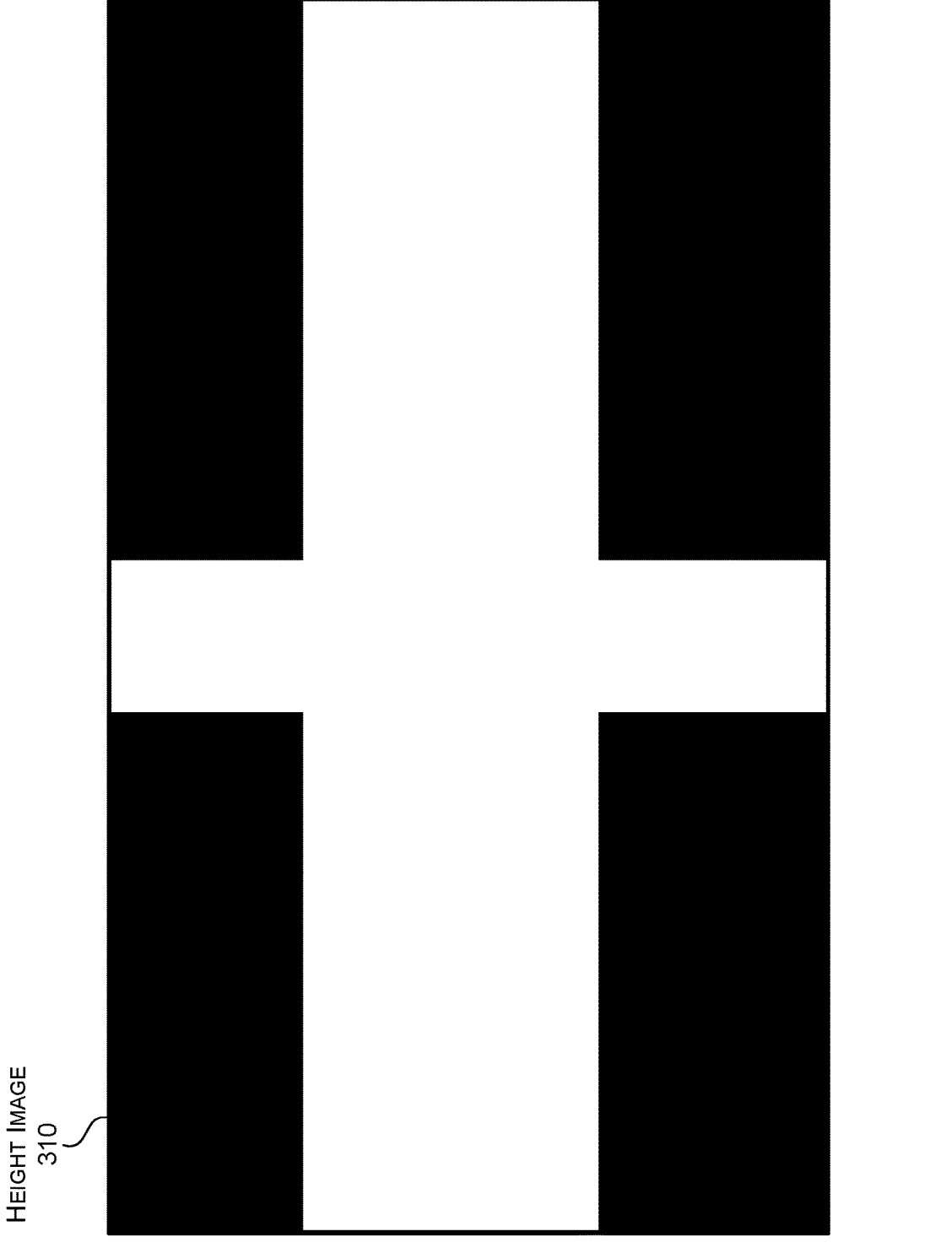

As shown by the example of FIG. 3B, the representation component 102 may generate a color image 308 associated with the environment 202. As described herein, the representation component 102 may generate the color image 308 using LiDAR data and/or image data. Additionally, and as shown by the example of FIG. 3C, the representation component 102 may generate a height image 310 associated with the environment 202. As described herein, the representation component 102 may generate the height map 310 using LiDAR data, RADAR data, image data, and/or any other type of distance data. Additionally, in some examples, and as illustrated by the example of FIG. 3C, since the roads 204 may include at least a slightly different height as compared to the surrounding portions of the environment 202, the height map 310 may indicate at least the locations of the roads 204 within the environment 202.

Referring back to the example of FIG. 1, the process 100 may include using one or more models 110 to process the representation data 108 and, based at least on the processing, generate input data 112 for one or more language models 114. As described herein, in some examples, the input data 112 may represent tokens (e.g., a tokenized representation) corresponding to the features located within the environment. For example, if the process 100 is associated with determining information associated with road lines, then the tokens may be associated with information corresponding to roads, lanes, the road lines, and/or the like within the environment. In some examples, the model(s) 110 may include any type of machine learning model, neural network, and/or the like that is configured to generate the input data 112 based at least on processing the representation data 108. For example, the model(s) may include a convolutional neural network, a feed-forward neural network, a space invariant artificial neural network, a recurrent neural network, a perceptron, a transformer, and/or any other type of network.

For instance, FIG. 4 illustrates an example of using the model(s) 110 to generate input data for the language model(s) 114, in accordance with some embodiments of the present disclosure. As shown, one or more convolution neural networks (CNNs) 402 may process representation data 404 (which may represent, and/or include, the representation data 108). Based at least on the processing, the CNNs 402 may extract the features (e.g., the roads, the lanes, the road lines, etc.), where the features may be represented by feature data 406. Additionally, in some examples, based at least on the processing, the CNNs 402 may generate a heatmap, which may be represented by heatmap data 408, where the heatmap indicates at least the locations associated with the features. For instance, if the features include road lines, then the heatmap (e.g., in the form of a segmentation mask) may be configured to indicate where the road lines are located within the environment.

A transformer 410 may then process the feature data 406 and/or the heatmap data 408. Based at least on the processing, the transformer 410 may generate one or more tokens 412 (which may represent, and/or include, the input data 112) for the language model(s) 114. As described herein, the token(s) 414 may represent information associated with the features, such as roads, lanes, road lines, and/or the like. Additionally, the token(s) 414 may be in a format that the language model(s) 114 is trained to process.

Referring back to the example of FIG. 1, the process 100 may include applying the input data 112 (e.g., the input token(s)) to the language model(s) 114. As described herein, the language model(s) 114 may include any type of language model, such as a statistical language model(s), a neural language model(s), a probabilistic language model(s), a large language model(s), and/or the like. The language model(s) 114 may then be trained to process the input data 112 and, based at least on the processing, generate output data 116 representing information associated with the features corresponding to the representation data 108. As described herein, in some examples, the output data 116 may represent tokens (e.g., a tokenized representation) corresponding to attributes or characteristics associated with the features, such as the locations, the colors, the types, the orientations, the sizes, and/or the like associated with the features. For example, if a feature includes a road line, then the attributes may include, but are not limited to, a location (e.g., a two-dimensional location, a three-dimensional location, etc.), a color (e.g., white, yellow, orange, etc.), a type (single solid line, dashed solid line, double solid line, double dashed line, etc.), a shape (e.g., straight, curved, etc.), and/or any other type of attribute or characteristic associated with the road line.

For instance, the language model(s) 114 may be trained to generate output data 116 representing a respective set of tokens for one or more points (e.g., each point) associated with a road line. For example, the output data 116 may include a first set of tokens associated with a first point on the road line, a second set of tokens associated with a second point on the road line, a third set of tokens associated with a third point on the road line, and/or so forth. Additionally, and with regard to a set of tokens, a first token may indicate a location of a point (e.g., the x-coordinate, the y-coordinate, and/or the z-coordinate), a second token may indicate a class of point (e.g., a starting point, an intermediary point, an ending point, etc.), a third token may indicate a type of the road line (e.g., solid, dashed, double, etc.), a fourth token may indicate a color (e.g., while, yellow, orange, etc.), a fifth token may indicate a shape of the road line (e.g., straight, curved, etc.), and/or one or more additional tokens may indicate one or more additional attributes.

In these examples, the language model(s) 114 may generate the output data 116 using a sequence. For example, the language model(s) 114 may generate the first set of tokens, followed by generating the second set of tokens, followed by generating the third set of tokens, and/or so forth. Additionally, in some examples, the language model(s) 114 may be configured to generate single tokens at different instances, such that tokens included in a set of tokens are generated at different time instances. Additionally, or alternatively, in some examples, the language model(s) 114 may be configured to generate a set of tokens at a single instance, such as different layers generate different tokens corresponding to different attributes for the set of tokens.

Figure 5:
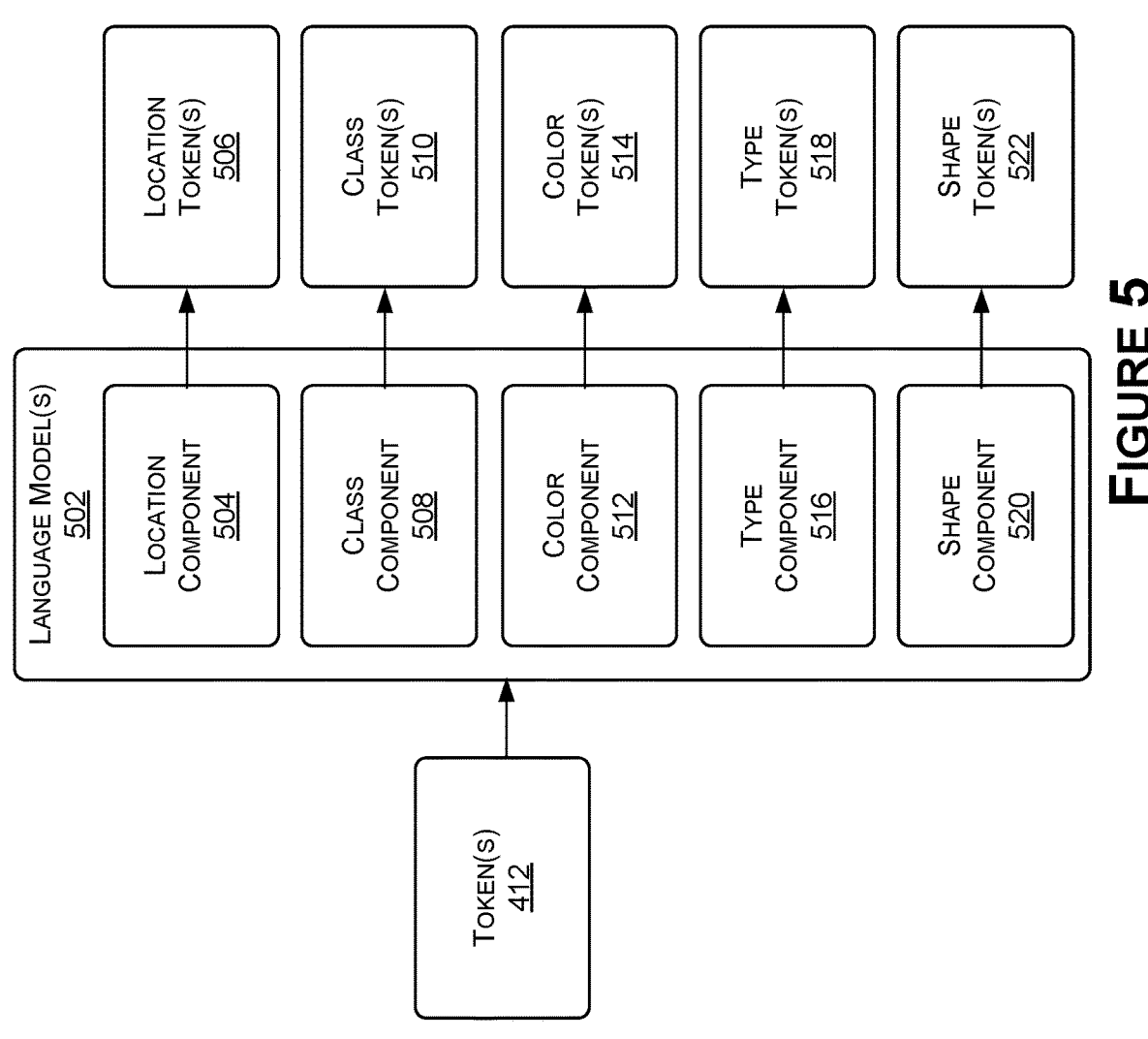
FIG. 5 illustrates an example of one or more language models generating output data representing attributes associated with features located within an environment, in accordance with some embodiments of the present disclosure.

For instance, FIG. 5 illustrates an example of one or more language models 502 (which may represent, and/or include, the language model(s) 114) generating output data representing attributes associated with one or more features, in accordance with some embodiments of the present disclosure. As shown, based at least on processing the input token(s) 412, the language model(s) 502 may include at least a location component 504 that is configured to generate one or more location tokens 506, a class component 508 that is configured to generate one or more class tokens 510, a color component 512 that is configured to generate one or more color tokens 514, a type component 516 that is configured to generate one or more type tokens 518, and a shape component 520 that is configured to generate one or more shape tokens 522. As described herein, a component 504, 508, 512, 516, and/or 520 may include, but is not limited to, one or more transformer modules, one or more layers, one or more heads, and/or any other component associated with the language model(s) 502.

In the example of FIG. 5, the language model(s) 502 may be configured to generate a set of tokens 506, 510, 514, 518, and/or 522 for a point associated with a feature (e.g., a road line) at a single instance. For example, the language model(s) 502 may generate a first set of tokens for a first point associated with the feature, followed by a second set of tokens for a second point associated with the feature, followed by a third set of tokens for a third point associated with the feature, and/or so forth. However, in other examples, the language model(s) 502 may individually generate the tokens 506, 510, 514, 518, and/or 522. For example, the language model(s) 502 may generate a location token 506, followed by a class token 510, followed by a color token 514, followed by a type token 518, and followed by a shape token 522 for a first set of tokens for a first point associated with the feature. The language model(s) 502 may then perform similar processes for a second set of tokens for a second point associated with the feature, followed by a third set of tokens for a third point associated with the feature, and/or so forth.

In some examples, the tokens 506, 510, 514, 518, and/or 522 may be associated with various latent spaces. For example, the location token(s) 506 may be associated with a first latent (or embedding) space, the class token(s) 510 may be associated with a second latent space, the color token(s) 514 may be associated with a third latent space, the type token(s) 518 may be associated with a fourth latent space, and the shape token(s) 522 may be associated with a fifth latent space. As such, the tokens 506, 510, 514, 518, and/or 522 may be interpreted to determine one or more of the attributes describes herein. For a first example, a first class token 510 may be associated with starting points, a second class token 510 may be associated with intermediary points, and a third class token 510 may be associated with ending point. For a second example, a first color token 514 may be associated with white, a second color token 514 may be associated with yellow, and/or so forth.

Referring back to the example of FIG. 1, the process 100 may include one or more processing components 118 processing the output data 116 and, based at least on the processing, generating feature information 120. In some examples, the feature information 120 may represent the information associated with the features within the environment. For example, if a feature includes a road line, then the feature information 120 may represent the location of the road line, the type of road line, the color of the road line, the shape of the road line, and/or any other attributes associated with the road line. As described herein, in some examples, the processing component(s) 118 may process the output data 116 using a sequence as the language model(s) 114 is generating the output data 116.

For instance, if the output data 116 is again associated with a road line, then the processing component(s) 118 may use a first portion of the output data 116 (e.g., a first set of tokens) to determine information associated with a first point of the road line. For example, the first portion of the output data 116 may indicate at least a first location of the first point, that the first point includes a starting point, a type of the road line at the first location, a color of the road line at the first point, and a shape of the road line at the first point. The processing component(s) 118 may then use a second portion of the output data 116 (e.g., a second set of tokens) to determine information associated with a second point of the road line. For example, the second portion of the output data 116 may indicate at least a second location of the second point, that the second point includes an intermediary point, a type of the road line at the second location, a color of the road line at the second point, and a shape of the road line at the second point. As such, the processing component(s) 118 may then connect the second point to the first point using a line that includes the type, the color, and/or the shape associated with the second point and/or the first point.

The processing component(s) 118 may then continue to perform these processes to continue generating the road line as the output data 116 continues to indicate additional intermediary points associated with the road line. For instance, the processing component(s) 118 may continue these processes until processing a final portion of the output data 116 (e.g., a final set of tokens) that indicates a final point of the road line. For example, the final portion of the output data 116 may indicate at least a final location of the final point, that the final point includes an ending point, a type of the road line at the point location, a color of the road line at the final point, and a shape of the road line at the final point. The processing component(s) 118 may then perform the processes described herein to connect the final point to the previous intermediary point such that an entirety of the line now represents the road line from the starting point to the ending point. Additionally, the processing component(s) 118 may perform similar processes for one or more additional road lines located within the environment.

Figure 6A:
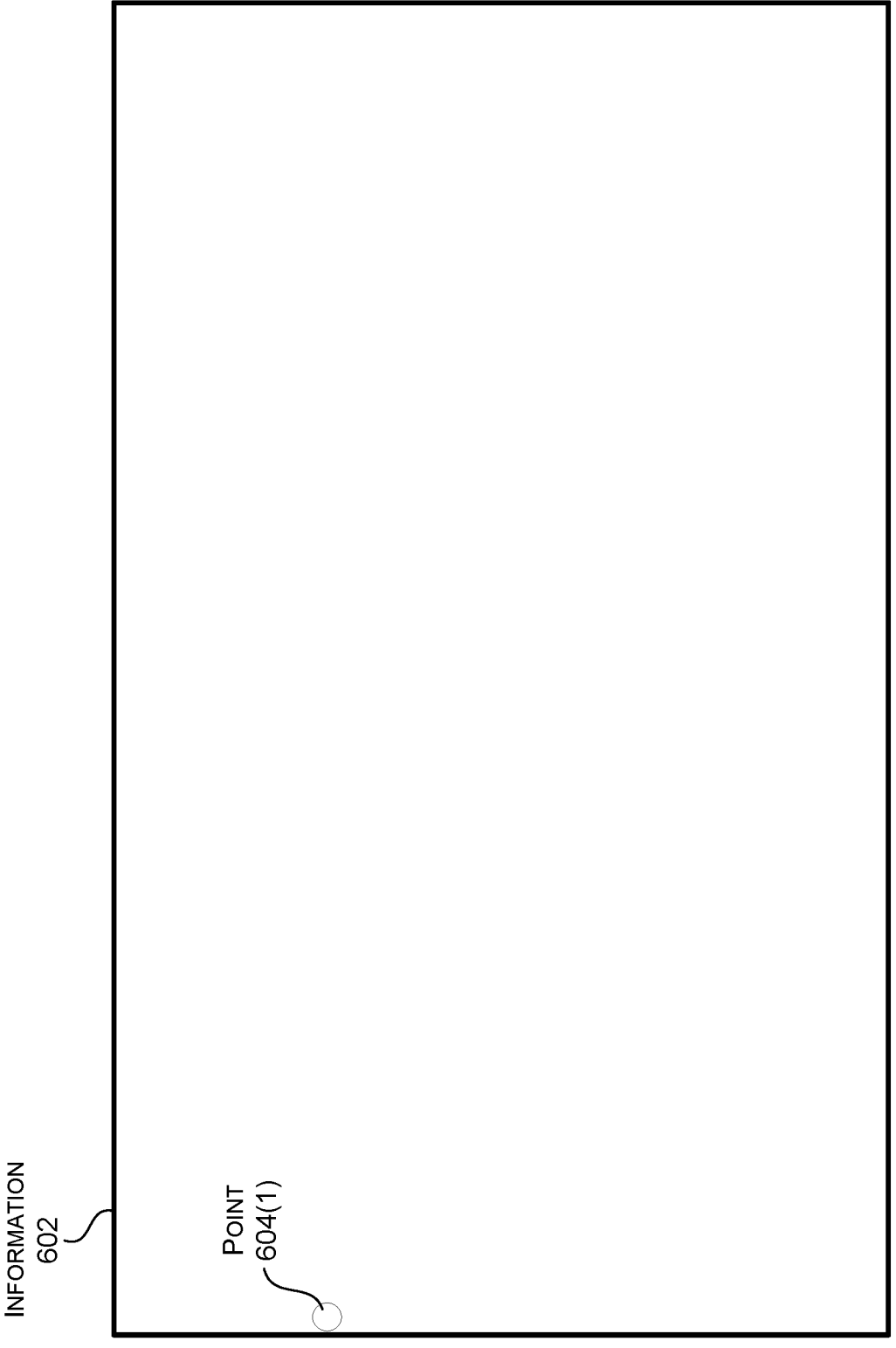
FIGS. 6A-6D illustrate an example of generating information associated with features located within an environment, in accordance with some embodiments of the present disclosure.

For instance, FIGS. 6A-6D illustrate an example of generating information 602 associated with the road lines 206 located within the environment 202, in accordance with some embodiments of the present disclosure. As shown by the example of FIG. 6A, the processing component(s) 118 may receive first output data (e.g., a first set of tokens) associated with a first point 604(1) corresponding to the first road line 206(1). As described herein, the first output data may indicate the first location of the first point 604(1), that the first point 604(1) includes a starting point, a type of the first road line 206(1) at the first location, a color of the first road line 206(1) at the first point 604(1), and a shape of the first road line 206(1) at the first point 604(1). As such, the processing component(s) 118 may start by inputting the information associated with the first point 604(1). In the example of FIGS. 6A-6D, white circle points may indicate starting points of the road lines 206.

Figure 6B:
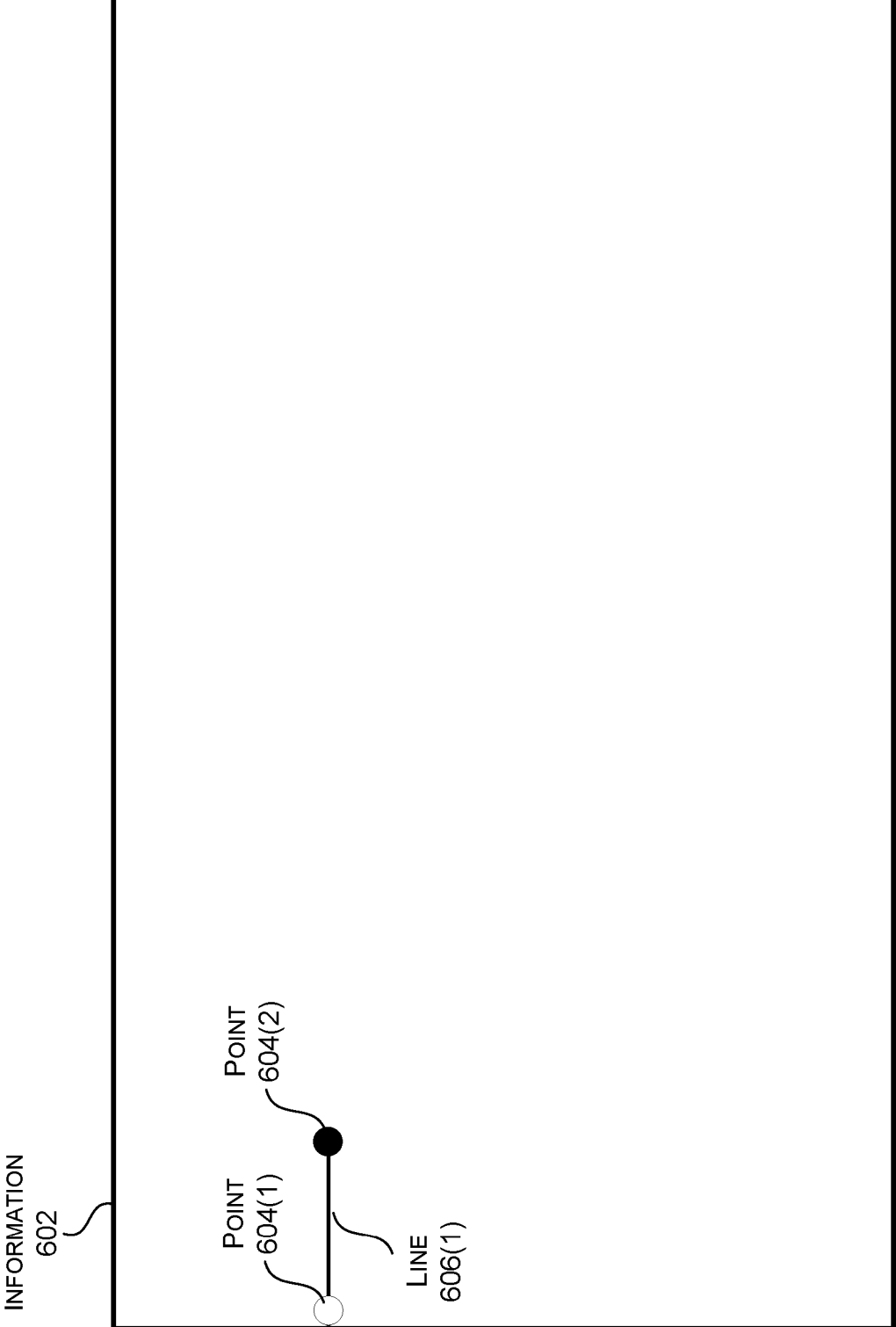

Next, and as illustrated by the example of FIG. 6B, the processing component(s) 118 may receive second output data (e.g., a second set of tokens) associated with a second point 604(2) corresponding to the first road line 206(1). As described herein, the second output data may indicate the second location of the second point 604(2), that the second point 604(2) includes an intermediary point, a type of the first road line 206(1) at the second location, a color of the first road line 206(1) at the second point 604(2), and a shape of the first road line 206(1) at the second point 604(2). As such, the processing component(s) 118 may input the information associated with the second point 604(2). In the example of FIGS. 6A-6D, grey circle points may indicate intermediary points of the road lines 206. Additionally, the processing component(s) 118 may connect the second point 604(2) to the first point 604(1) using a first line 606(1). As described herein, the first line 606(1) may include a shape that is based on the second output data, such as a straight line, a curved line (e.g., a Bezier curve), and/or any other shape of line. The first line 606(1) may also include the color and/or the type indicated by the second output data.

Figure 6C:

Next, and as illustrated by the example of FIG. 6C, the processing component(s) 118 may continue to perform these processes using additional output data associated with additional intermediary points to input points 604(3)-(7) and lines 606(2)-(6) connecting the points 604(2)-(7). As described herein, the processing component(s) 118 may continue performing these processes for intermediary points until receiving output data associated with an ending point.

For example, the processing component(s) 118 may receive eighth output data (e.g., an eighth set of tokens) associated with an eighth point 604(8) corresponding to the first road line 206(1). As described herein, the eighth output data may indicate the eighth location of the eighth point 604(8), that the eighth point 604(8) includes the ending point, a type of the first road line 206(1) at the eighth location, a color of the first road line 206(1) at the eighth point 604(8), and a shape of the first road line 206(1) at the eighth point 604(8). As such, the processing component(s) 118 may input the information associated with the eighth point 604(8). In the example of FIGS. 6A-6D, black circle points may indicate ending points of the road lines 206. Additionally, the processing component(s) 118 may connect the eighth point 604(8) to the seventh point 604(7) using the seventh line 606(7). As such, the processing component(s) 118 may generate the line associated with the first road line 206(1).

Figure 6D:
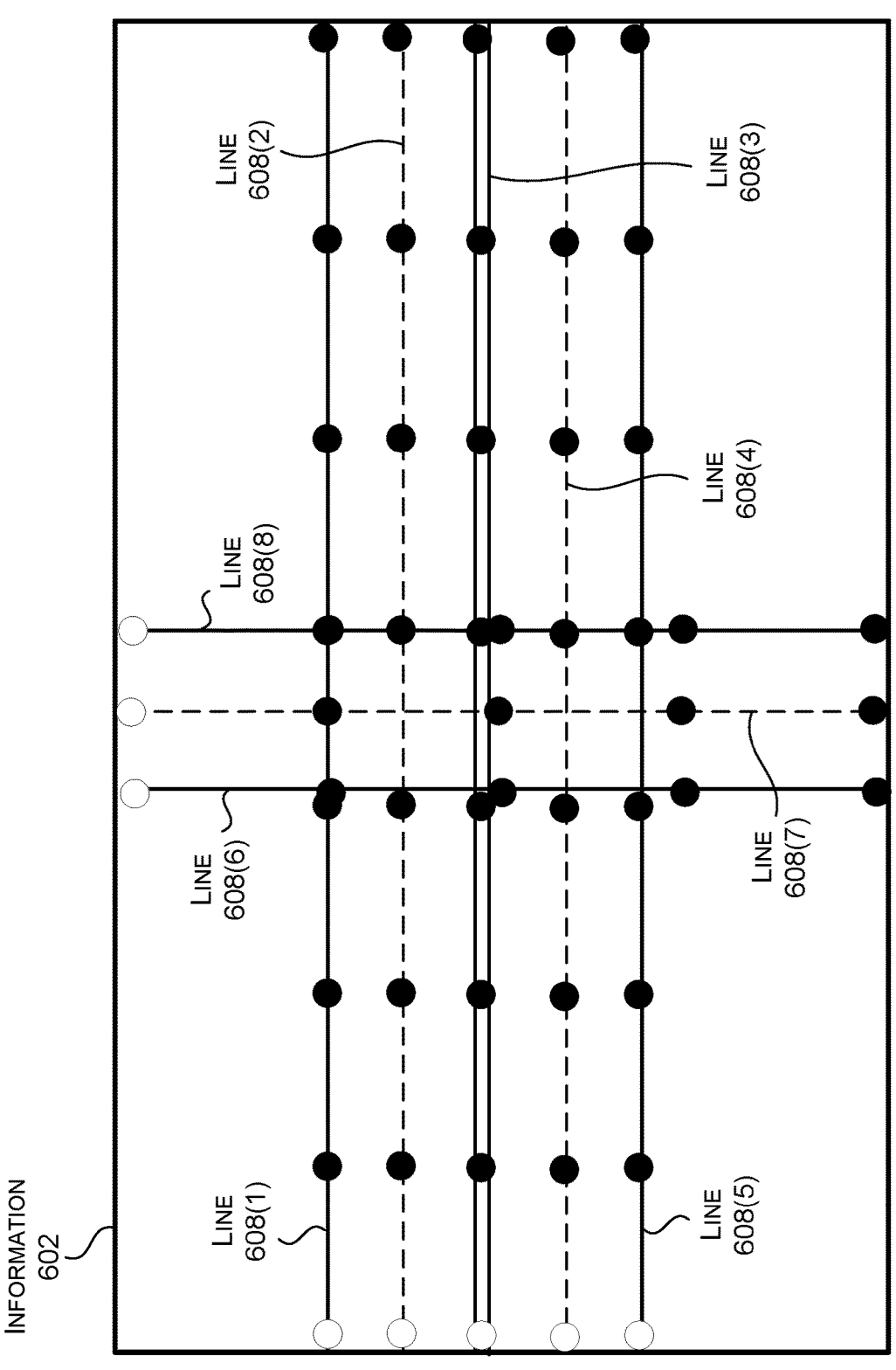

Next, and as illustrated in the example of FIG. 6D, the processing component(s) 118 may continue to perform these processes to respectively generate lines 608(1)-(8) (also referred to singularly as "line 608" or in plural as "line 608") for each of the road lines 206. As shown, based at least on performing the processes described herein, the lines 608 may be similar to the road lines 206.

In some examples, the language model(s) 114 may be configured to generate different numbers of points associated with the information 602. For example, a grid size associated with the language model(s) 114 may be configured such that the language model(s) 114 generates a greater number of points as the grid size increases. Additionally, in some examples, and as shown by the example of FIG. 6D, the lines 606(6)-(8), which are associated with the second road 204(2) that is at least partially located under the first road 204(1), still indicates what the road lines 206(6)-(8) may include even under the overpass. In such examples, the language model(s) 114 may be trained to still generate these portions of the lines 606(6)-(8) even when these portions of the lines 606(6)-(8) are occluded.

Referring back to the example of FIG. 1, while the example of FIG. 1 illustrates the model(s) 110 and the processing component(s) 118 as being separate from the language model(s) 114, in other examples, the model(s) 110 and/or the processing component(s) 118 may include at least a portion of the language model(s) 110. For example, the model(s) 110 and/or the processing component(s) 118 may include one or more layers of the language model(s) 114.

Figure 7A:
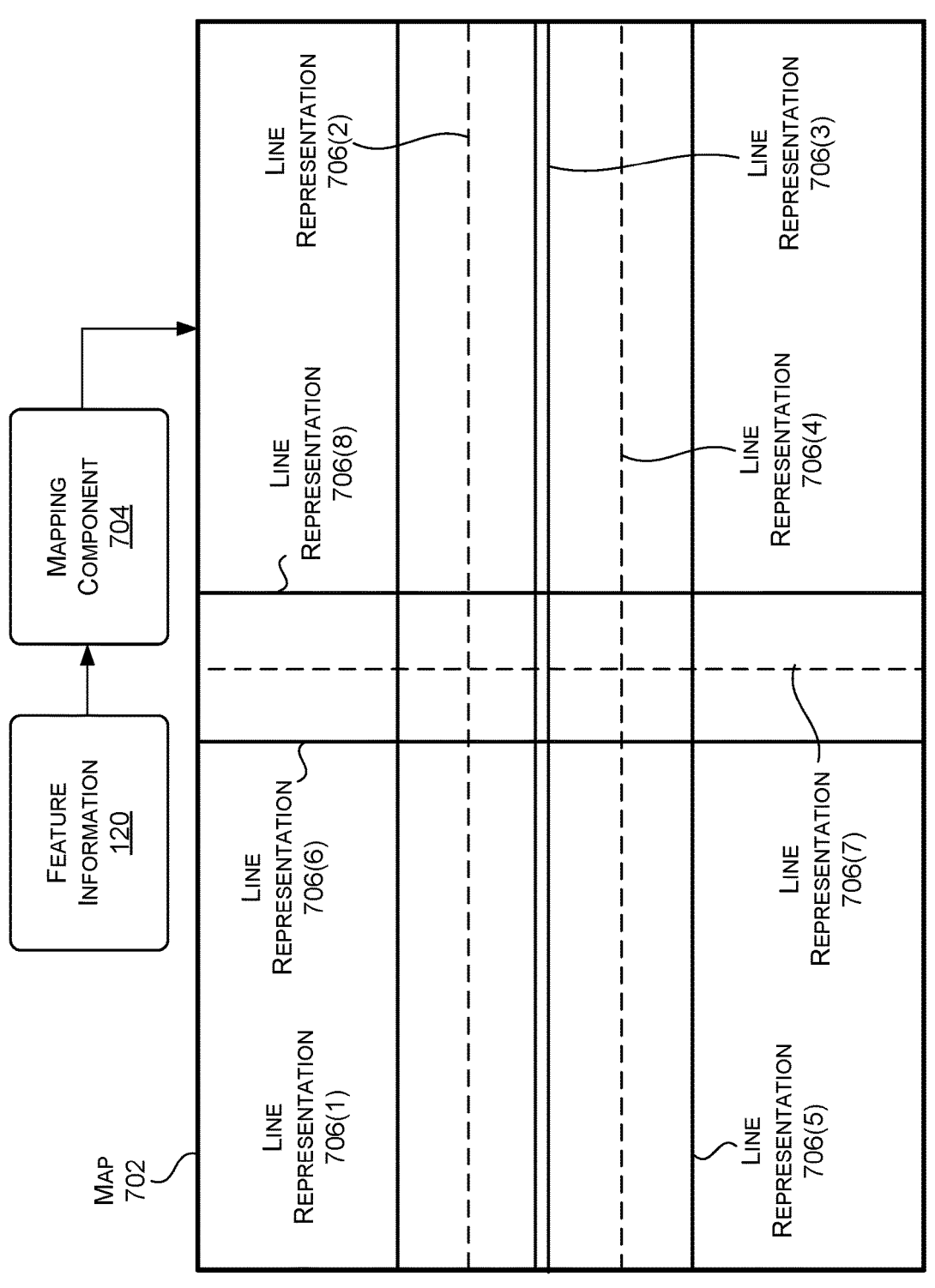
FIG. 7A illustrates an example of updating a map to indicate information associated with features located within an environment, in accordance with some embodiments of the present disclosure.

As described herein, one or more processes may then be performed using the feature information 120. For instance, FIG. 7A illustrates an example of updating a map 702 to indicate information associated with one or more features located within the environment 202, in accordance with some embodiments of the present disclosure. As shown, a mapping component 704 may use the feature information 120 to update the map 702 associated with the environment 202. As shown, the map 702 may be updated to indicate at least road line representations 706(1)-(8) (also referred to singularly as "road line representation 706" and/or in plural as "road line representations 706") which are respectively associated with the road lines 206. By performing the processes described herein, the road line representations 706 may include the same type, color, shape, and/or any other attributes associated with the road lines 206.

Figure 7B:
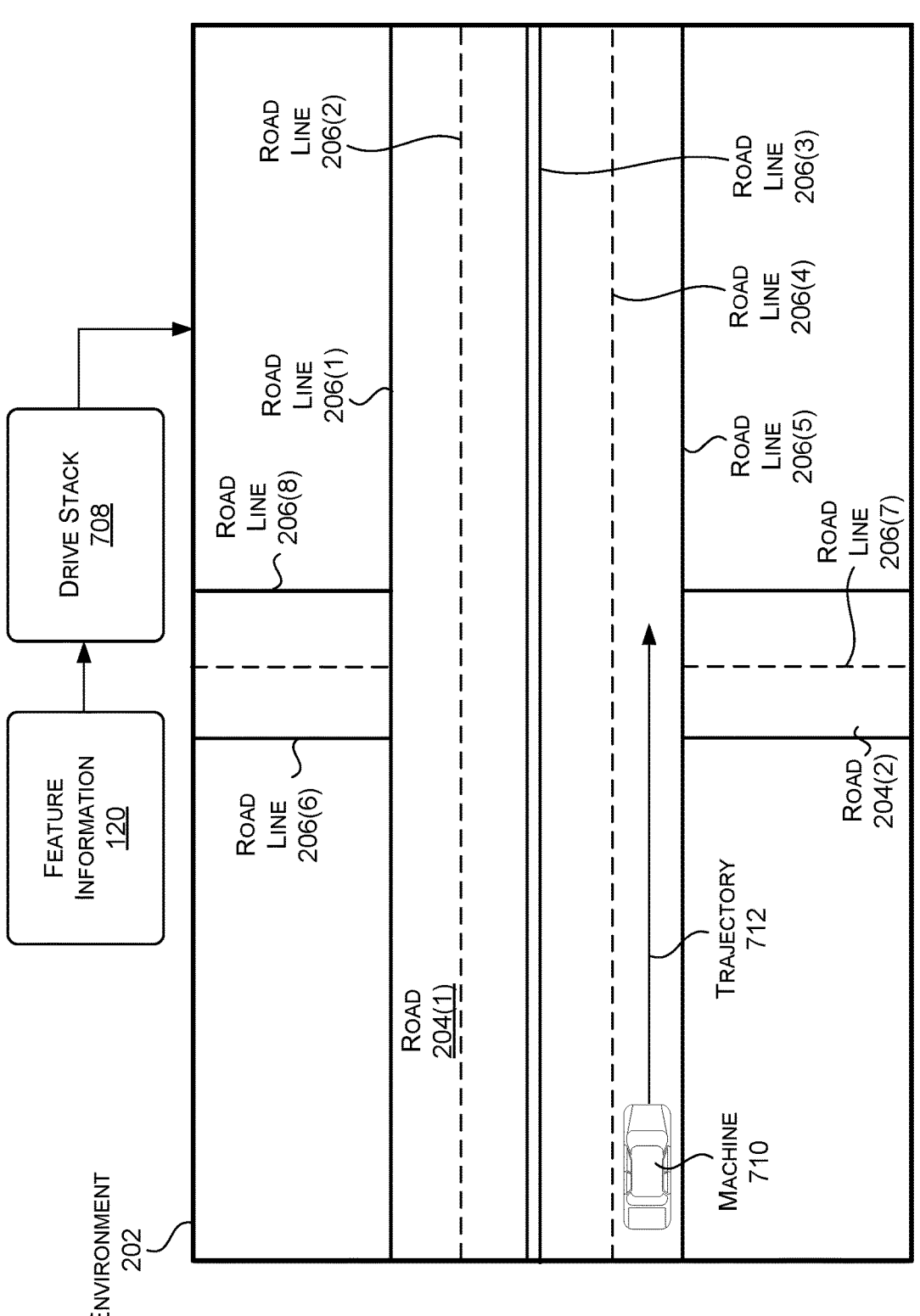
FIG. 7B illustrates an example of controlling one or more machines based at least on information associated with features located within an environment, in accordance with some embodiments of the present disclosure.

Additionally, FIG. 7B illustrates an example of controlling one or more machine based at least on information associated with one or more features located within the environment 202, in accordance with some embodiments of the present disclosure. As shown, a drive stack 708 associated with a machine 710 (e.g., an autonomous vehicle 1100) may use the feature information 120 to determine a trajectory 712 for the machine 710 to navigate within the environment 202. For example, the drive stack 708 may determine the trajectory 712 such that the machine 710 follows one or more rules of the road with respect to the road lines 206. The drive stack 708 may then cause the machine 710 to navigate according to the trajectory 712.

For more detail about determining information associated with features, the objective of the process 100 may be to detect lane entities in a given input scene and discern the topological relationships between the lane entities. As such, the input associated with the process 100 may include one or more of the representations (e.g., the images) described herein. For instance, a lane graph may be defined by $\mathcal{G}$ (V, E), where V represents a set of lanes $\{l_1, l_2, \ldots, l_L\}$ in the scene. Each lane $l_i$ then consists of an ordered set of 3D vertices $[v_1^{(i)}, v_2^{(i)}, \ldots, v_{v_i}^{(i)}]$, where $v_j^{(i)} \in \mathbb{R}^3$ and $V_i$ is the number of vertices in $l_i$. Additionally, each lane $l_i$ and vertex $v_i$ may have additional attributes attached to it.

As such, $E \subset V \times V$ denotes the set of edges, symbolizing the topology relationships between lanes. The topology may then be represented by an adjacency matrix where an entry (i,j) is set to 1 only if the endpoint of lane $l_i$ is connected to start point of lane $l_j$.

As such, to generate lane graphs using a transformer decoder, the lane graph $\mathcal{G}$ may be expressed as sequences of discrete tokens. To define the tokens, the lane graph $\mathcal{G}$ may be broken into its constituent lanes $\{l_1, l_2, \ldots, l_L\}$ and represent each lane $l_i$ as a sequence of key points $l_i = [k_1^{(i)}, k_2^{(i)}, \ldots, k_{N_i}^{(i)}]$. Here, $N_i$ is the number of key points in the

15 lane and $k_j^{(i)} \in \mathbb{R}^3$. A lane's key points may then comprise of its endpoints and its intersections with fixed equidistant grid lines along the X and Y axes. Furthermore, the key points may be ordered along the direction of the lane.

Next, the lanes in $\mathcal{G}$ may be serialized into a single sequence. This may be done by concatenating the key points of one or more (e.g., all) of the lanes together resulting in a sequence of length N, where $$N = \Sigma_{i=1}^L N_i.$$

Additionally, class labels may be introduced for each key point to act as lane delimiters. This may be because there needs to be a way to break the sequence back into individual lanes. As such, two class tokens are added, $\langle EOL \rangle$ for the last key point in each lane and $\langle VTX \rangle$ for every other key point.

The tokenization scheme described herein may result in a sequence $[s_1, s_2, \ldots, s_N]$, where $s_i = (c_i, x_i, y_i, z_i)$ represents one key point in the lane graph serialization. As such, $c_i, x_i, y_i, z_i \in \mathbb{Z}$ denote the class and coordinate tokens, respectively. As such, this sequence may be represented by a matrix $S \in \mathbb{Z}^{N \times 4}$.

In some examples, for ordering of the lanes in the concatenated sequence, a randomized depth-search traversal of the directed graph of lanes may be adopted. More specifically, a lane at random may be sampled and its key point may be added to the sequence. Next, depth-first traversal from this lane may be performed and the key points of each visited lanes may be added in order of traversal. This process may then continue to repeat until all lanes in $\mathcal{G}$ have been visited.

With regard to the decoder architecture, given a scene I and one or more (e.g., all) previously generated key point tokens $S_{[1:t-1]} = [s_1, s_2, \ldots, s_{t-1}]$, the decoder may be trained to predict tokens for the next key point $s_t = (c_t, x_t, y_t, z_t)$ and the Bezier control points $b_t \in \mathbb{R}^{3C}$ for the segment between $s_{t-1}$ and $s_t$. Here, C is the number of Bezier control points. As such, the probability of the predictions at step t may be decomposed into conditional probabilities:

$$p\left(c_t, x_t, y_t, z_t, b_t \mid S_{[1:t-1]}, I\right) =$$
$$p\left(b_t \mid c_t, x_t, y_t, z_t, S_{[1:t-1]}, I\right) \times p\left(z_t \mid c_t, x_t, y_t, S_{[1:t-1]}, I\right) \times$$
$$p\left(y_t \mid c_t, x_t, S_{[1:t-1]}, I\right) \times p\left(x \mid c_t, S_{[1:t-1]}, I\right) \times p\left(c_t \mid S_{[1:t-1]}, I\right)$$

In this cascading decoder architecture, each of these conditional probabilities may be modeled with a transformer decoder. Additionally, each transformer decoder cross-attends to the input scene encoding $F_I$ and is followed by the MLP predictor head.

Figure 8:
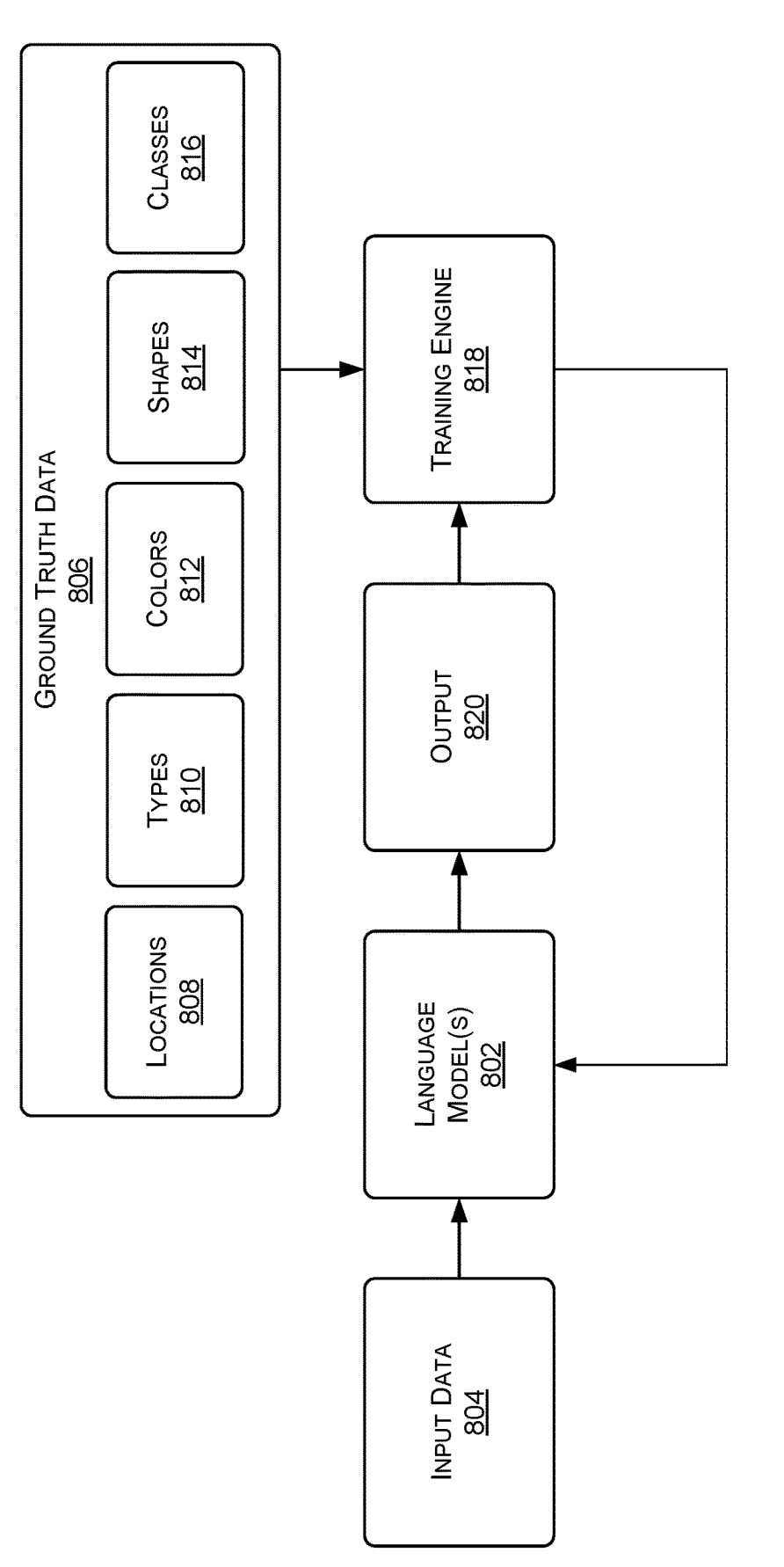
FIG. 8 illustrates a data flow diagram illustrating a process for training one or more language models to generate output data representing information associated with features located within an environment, in accordance with some embodiments of the present disclosure.

In some examples, the language model(s) 114 may be trained to perform one or more of the processes described herein. For instance, FIG. 8 illustrates a data flow diagram illustrating a process 800 for training one or more language models 802 (which may represent, and/or include, the language model(s) 114 and/or the language model(s) 502), in accordance with some embodiments of the present disclosure.

As shown, the language model(s) 802 may be trained using input data 804. In some examples, the input data 804 may be similar to the input data 112, the representation data 108, and/or the token(s) 412. For instance, the input data 804 may represent tokens corresponding to features within an environment. For example, the input data 804 may be generated using one or more similar processes as the input data 112 and/or the token(s) 412 described herein (e.g., using a representation component 102).

The language model(s) 802 may be trained using the training input data 804 as well as corresponding ground truth data 806. In some examples, the ground truth data 806 may include tokens corresponding various attributes associated with the features. For example, the ground truth data 806 may include tokens that represent locations 808 of points, tokens that represent types 810 (e.g., straight line, dashed line, double line, etc.) associated with the points, tokens that represent colors 812 (e.g., white, yellow, orange, etc.) associated with the points, tokens that represent shapes 814 (e.g., straight, curved, etc.) associated with the points, and tokens that represent classes 816 (e.g., starting points, intermediary points, ending points, etc.) associated with the points. As described herein, the ground truth data 806 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof. In some examples, for each instance of the input data 804, there may be corresponding ground truth data 806.

As further illustrated in FIG. 8, a training engine 818 may use one or more loss functions that measure loss (e.g., error) in outputs 820 as compared to the ground truth data 806. In some examples, the outputs 818 may be similar to the output data 116 and/or the tokens 506, 510, 514, 518, and/or 522. For example, the outputs 818 may include tokens corresponding to various attributes associated with the features. Any type of loss function may be used, such as cross entropy loss, mean squared error, mean absolute error, mean bias error, and/or other loss function types. In some examples, different outputs 818 may have different loss functions. For example, the locations may include a first loss function, the types may include a second loss function, the colors may include a third loss function, the shapes may include a fourth loss function, and the classes may include a fifth loss function. In such examples, the loss functions may be combined to form a total loss, and the total loss may be used to train (e.g., update the parameters of) the language model(s) 802. In any example, backward pass computations may be performed to recursively compute gradients of the loss function(s) with respect to training parameters. In some examples, weights and biases of the language model(s) 802 may be used to compute these gradients.

For instance, the loss may be decomposed into at least class tokens, coordinate tokens, and Bezier coefficient regression losses, wherein:

$$\mathcal{L} = \lambda_C \mathcal{L}_C + \lambda_X \mathcal{L}_X + \lambda_Y \mathcal{L}_Y + \lambda_Z \mathcal{L}_Z + \lambda_{reg} \mathcal{L}_{reg}$$

Here, $\lambda_C$, $\lambda_X$, $\lambda_Y$, $\lambda_Z$, and $\lambda_{reg}$ may include scalar loss values and $\mathcal{L}_C$, $\mathcal{L}_X$, $\mathcal{L}_Y$, $\mathcal{L}_Z$ may include regular cross-entropy losses for the token classification tasks. Additionally, $\mathcal{L}_{reg}$ may include a L1 loss for lane segment regression. In some examples, to compute $\mathcal{L}_{reg}$, P equidistant points may be sampled along the raw target lane segments and the predicted Bezier curves.

Now referring to FIGS. 9 and 10, each block of methods 900 and 1000, described herein, comprises a computing process that may be performed using any combination of hardware, firmware, and/or software. For instance, various functions may be carried out by a processor executing instructions stored in memory. The methods 900 and 1000 may also be embodied as computer-usable instructions stored on computer storage media. The methods 900 and 1000 may be provided by a standalone application, a service or hosted service (standalone or in combination with another hosted service), or a plug-in to another product, to name a few. In addition, the methods 900 and 1000 are described, by way of example, with respect to FIG. 1. However, these methods 900 and 1000 may additionally or alternatively be executed by any one system, or any combination of systems, including, but not limited to, those described herein.

FIG. 9 illustrates a flow diagram showing a method 900 for determining locations of road lines using one or more language models, in accordance with some embodiments of the present disclosure. The method 900, at block B902, may include generating, based at least on sensor data, one or more representations corresponding to an environment. For instance, the representation component 102 may generate representation data 108 using at least the sensor data 104. As described herein, the representation data 108 may represent one or more representations corresponding to the environment, such as one or more images representing the environment. In some examples, the image(s) may include at least an intensity image, a color image, a height image, and/or any other type of image.

The method 900, at block B904, may include generating, based at least on the one or more representations, one or more input tokens representative of one or more road lines associated with the environment. For instance, the model(s) 110 may process the representation data 108 and, based at least on the processing, generate the input data 112 representative of the one or more input tokens. As described herein, the input token(s) may be associated with the road line(s) as corresponding to the representation data 108.

The method 900, at block B906, may include generating, based at least on one or more language models processing the one or more input tokens, one or more output tokens representative of one or more attributes associated with the one or more road lines. For instance, the language model(s) 114 may process the input data 112 and, based at least on the processing, generate the output data 116 representative of the one or more output tokens. As described herein, the language model(s) 114 may generate a respective set of tokens for one or more (e.g., each) point associated with the road line(s). Additionally, within a set of tokens, a respective token may be associated with one or more attributes. For example, a first token may indicate a location of a point (e.g., the x-coordinate, the y-coordinate, and/or the z-coordinate), a second token may indicate a class of point (e.g., a starting point, an intermediary point, an ending point, etc.), a third token may indicate a type of road line (e.g., solid, dashed, double, etc.), a fourth token may indicate a color (e.g., while, yellow, orange, etc.), a fifth token may indicate a shape (e.g., straight, curved, etc.), and/or one or more additional tokens that indicated one or more additional attributes.

The method 900, at block B908, may include determining, based at least on the one or more output tokens, one or more locations associated with the one or more road lines within the environment. For instance, the processing component(s) 118 may determine the location(s) associated with the road line(s) using at least the output data 116. As described herein, the processing component(s) 118 may determine the location(s) processing sequential points associated with the output data 116. Additionally, in some examples, the processing component(s) 118 may determine additional information associated with the road line(s), such as the type(s), the color(s), and/or the shape(s) of the road line(s).

FIG. 10 illustrates a flow diagram showing a method 1000 for determining information associated with features located within an environment using one or more language models, in accordance with some embodiments of the present disclosure. The method 1000, at block B1002, may include generating, based at least on sensor data, one or more representations corresponding to an environment. For instance, the representation component 102 may generate representation data 108 using at least the sensor data 104. As described herein, the representation data 108 may represent one or more representations corresponding to the environment, such as one or more images representing the environment. In some examples, the image(s) may include at least an intensity image, a color image, a height image, and/or any other type of image.

The method 1000, at block B1004, may include generating, based at least on the one or more representations, input data corresponding to one or more features associated with the environment. For instance, the model(s) 110 may process the representation data 108 and, based at least on the processing, generate the input data 112. As described herein, in some examples, the input data 112 may represent of the one or more input tokens associated with the feature(s).

The method 1000, at block B1006, may include generating, based at least on one or more language models processing the input data, output data representative of one or more attributes associated with the one or more features. For instance, the language model(s) 114 may process the input data 112 and, based at least on the processing, generate the output data 116 representative of the attribute(s) associated with the feature(s). As described herein, the output data 116 may represent one or more output tokens associated with the attribute(s).

The method 1000, at block B1008, may include determining, based at least on the output data, information associated with the one or more features. For instance, the processing component(s) 118 may determine the information associated with the feature(s) using at least the output data 116. As described herein, the information may include one or more locations of the feature(s), one or more types associated with the feature(s), one or more colors associated with the feature(s), one or more shapes associated with the feature(s), and/or any other information associated with the feature(s).

Example Autonomous Vehicle

Figure 11A:
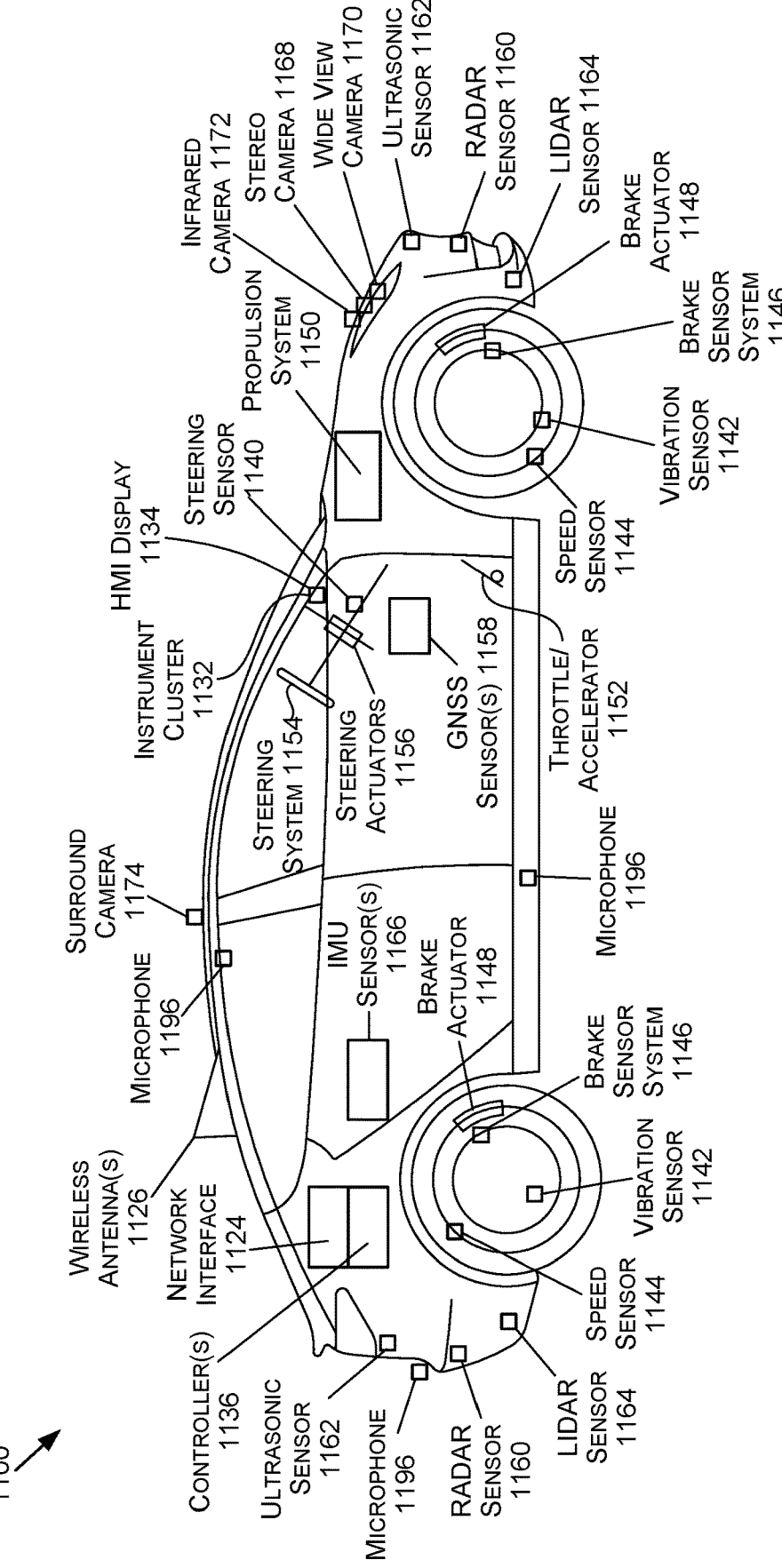
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
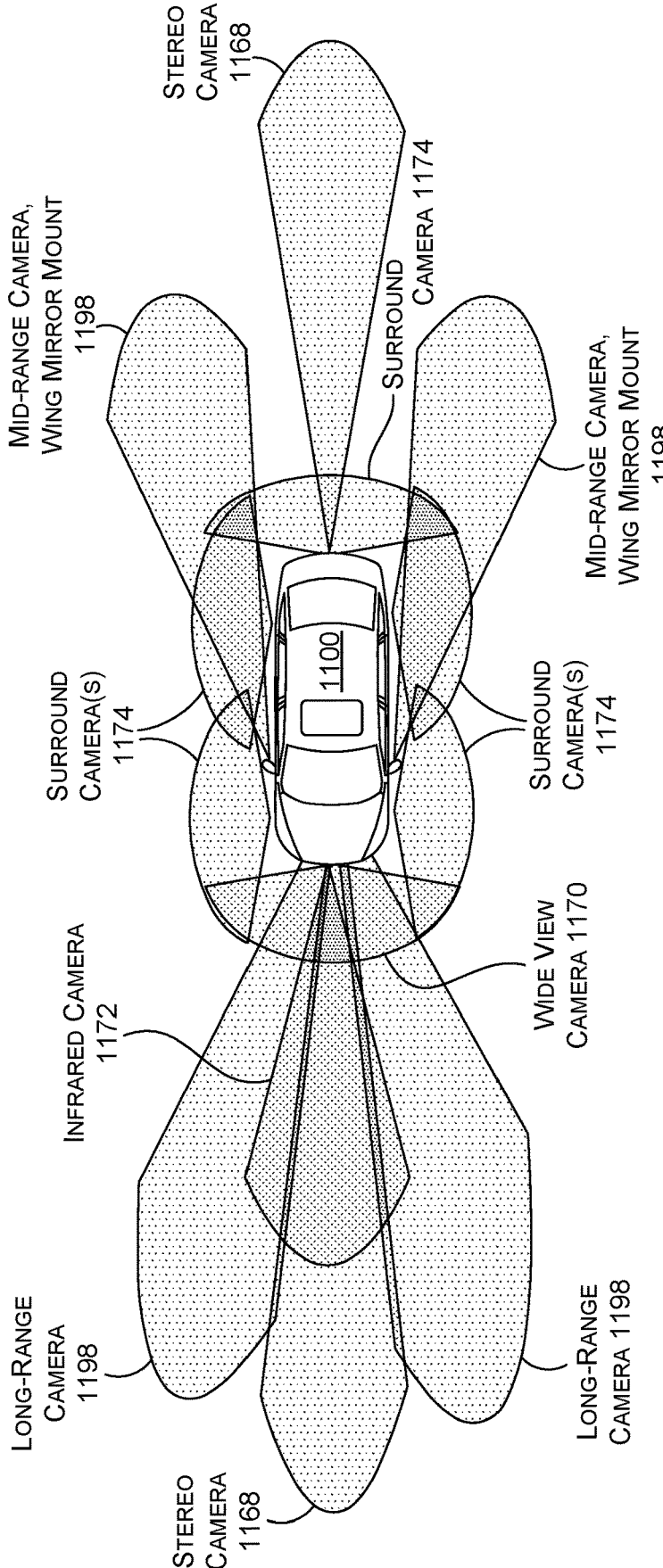
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warn- ing, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflec- tions from the dashboard reflected in the windshield mirrors) which may interfere with the camera's image data capture abilities. With reference to wing-mirror mounting assem- blies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front- facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semi- conductor ("CMOS") color imager. Another example may be a wide-view camera(s) 1170 that may be used to perceive objects coming into view from the periphery (e.g., pedes- trians, crossing traffic or bicycles). Although only one wide- view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Con- troller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to acti- vate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing infor- mation used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cam- eras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occu- pancy grid. A wide variety of cameras may be used includ- ing, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
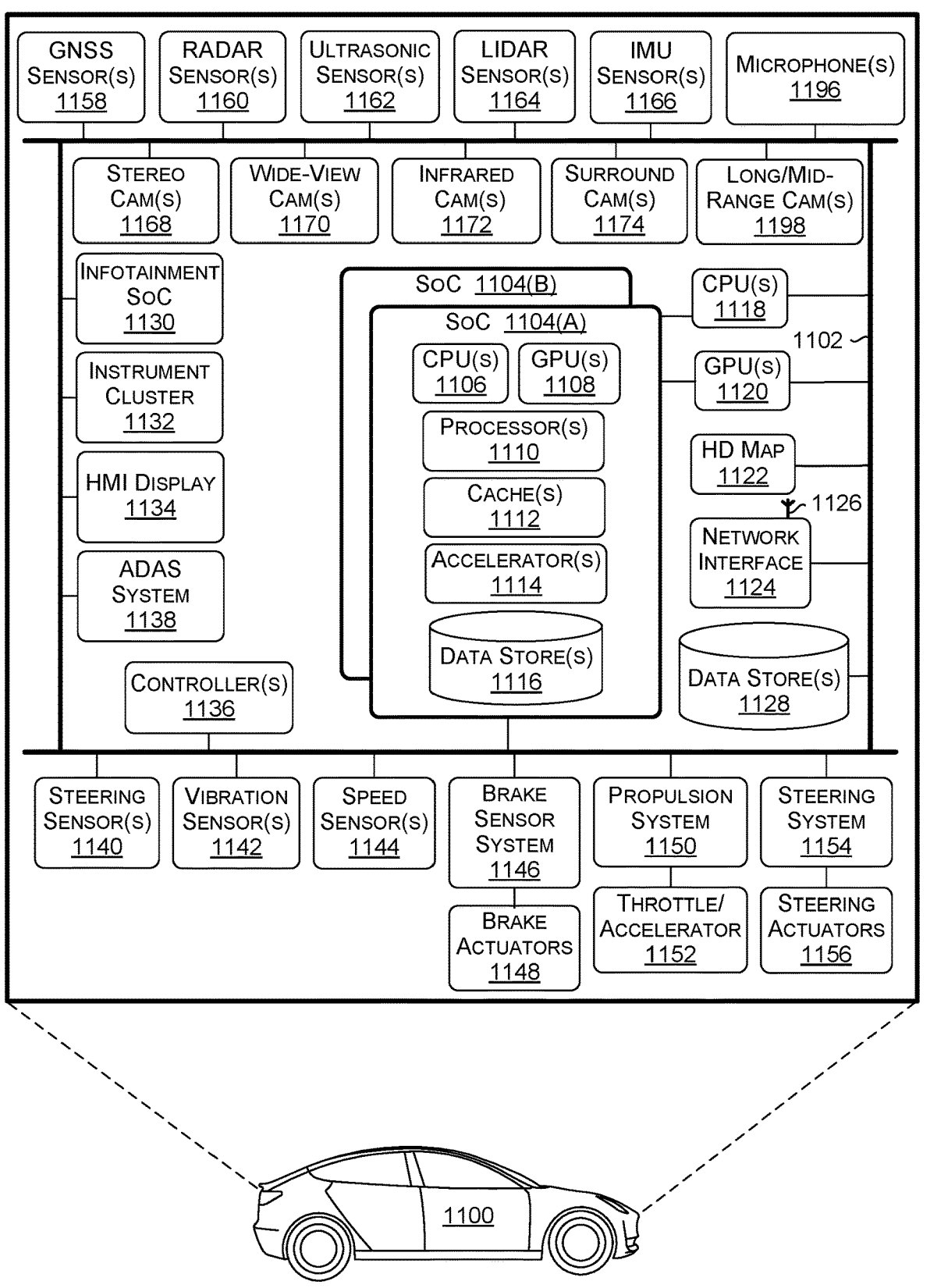
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects.

Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
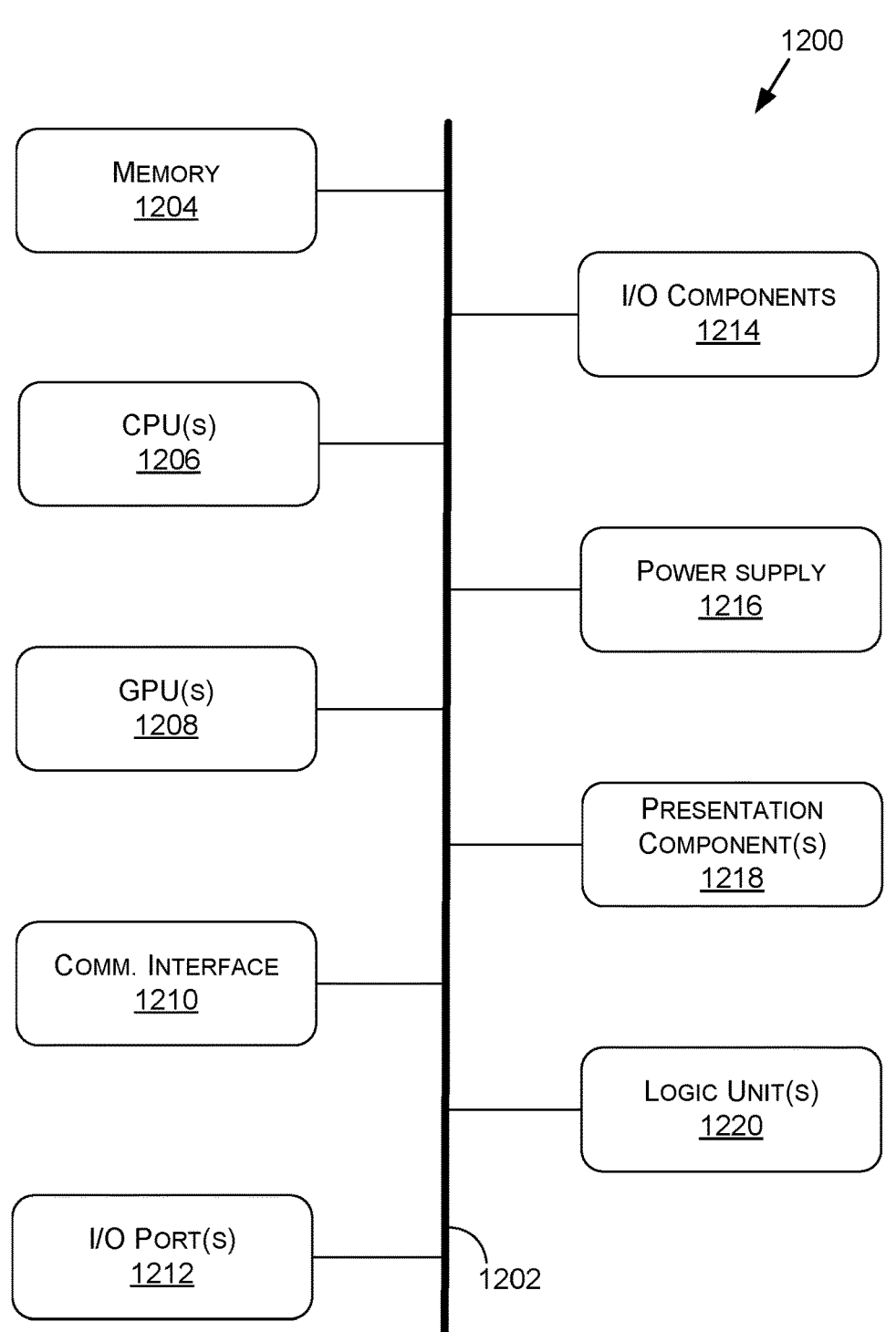
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
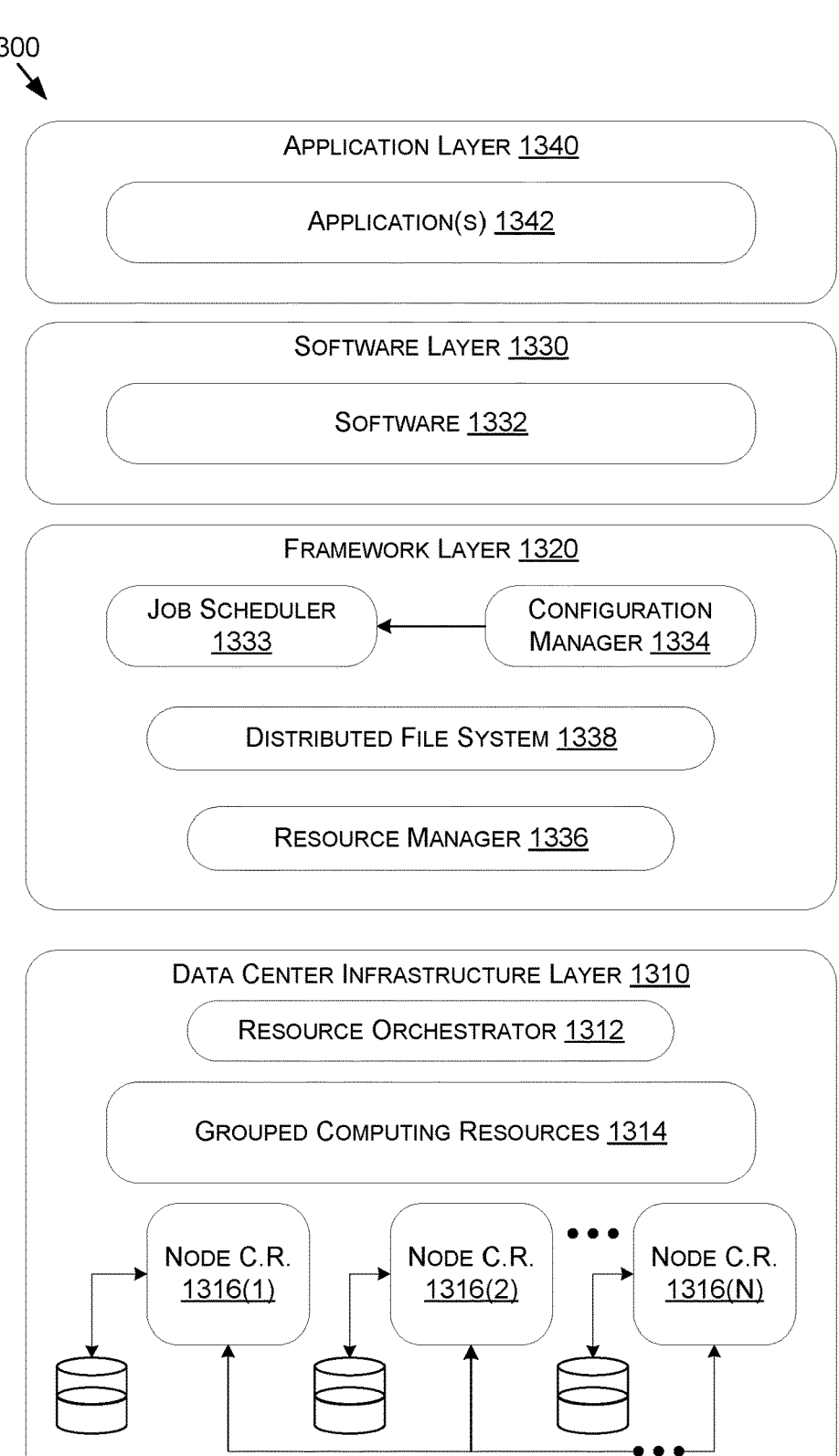
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s

1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE CLAUSES

A: A method comprising: generating, based at least on one or more representations corresponding to an environment, one or more input tokens representative of one or more features associated with the environment; generating, based at least on one or more language models processing the one or more input tokens, one or more output tokens representative of one or more attributes associated with the one or more features; and determining, based at least on the one or more output tokens, information associated with the one or more features within the environment.

B: The method of paragraph A, wherein: the one or more features include one or more surface lines represented by the one or more representations; the one or more input tokens are representative of the one or more surface lines as represented by the one or more representations; and the one or more output tokens are representative of at least the information associated with the one or more surface lines within the one or more representations.

C: The method of paragraph A or paragraph B, further comprising determining, based at least on the one or more output tokens, at least one of: one or more classes associated with one or more points corresponding to the one or more features; one or more types associated with the one or more features; one or more colors associated with the one or more features; or one or more shapes associated with the one or more features.

D: The method of any one of paragraphs A-C, wherein the one or more output tokens include at least: one or more first tokens associated with a first point corresponding to a feature of the one or more features; and one or more second tokens associated with a second point corresponding to the feature.

E: The method of paragraph D, wherein the determining the information associated with the one or more features within the environment comprises: determining, based at least on the one or more first tokens, a first location associated with the first point within the environment; determining, based at least on the one or more second tokens, a second location associated with the second point within the environment; and determining a connection between the second point and the first point.

F: The method of paragraph E, further comprising: determining, based at least on the one or more first tokens, that the first point includes a starting point associated with the feature; and determining, based at least on the one or more second tokens, that the second point includes at least one of an intermediary point or an ending point associated with the feature, wherein the determining the connection between the second point and the first point is based at least on the first point including the starting point and the second point including the at least one of the intermediary point or the ending point.

G: The method of any one of paragraphs A-F, wherein the generating the one or more input tokens comprises: generating, based at least on one or more models processing the one or more representations, at least one of feature data associated with the one or more representations or heatmap data associated with the one or more representations; and generating, based at least on the at least one of the feature data or the heatmap data, the one or more input tokens representative of the one or more features associated with the environment.

H: The method of any one of paragraphs A-G, wherein the one or more representations comprises one or more of: an intensity image corresponding to the environment; a color image corresponding to the environment; a height image corresponding to the environment; or a point cloud corresponding to the environment.

I: The method of any one of paragraphs A-H, further comprising one or more of: causing a map to be updated to indicate at least the information associated with the one or more features; or causing a machine to navigate based at least on the information associated with the one or more features.

J: A system comprising: one or more processors to: generate one or more representations corresponding to one or more features located within an environment; generate, based at least on one or more language models processing input data associated with the one or more representations, output data representative of one or more attributes associated with the one or more features; and perform one or more operations based at least on the output data.

K: The system of paragraph J, wherein: the input data represents one or more input tokens associated with the one or more features; and the output data represents one or more output tokens associated with the one or more attributes.

L: The method of paragraph J or paragraph K, wherein: the one or more features include one or more traffic features represented by the one or more representations; the input data is representative of the one or more traffic features as represented by the one or more representations; and the output data is representative of at least one or more locations associated with the one or more features within the one or more representations.

M: The system of any one of paragraphs J-L, wherein the one or more processors are further to determine, based at least on the output data, at least one of: one or more classes associated with one or more points corresponding to the one or more features; one or more types associated with the one or more features; one or more colors associated with the one or more features; or one or more shapes associated with the one or more features.

N: The system of any one of paragraphs J-M, wherein the output data includes at least: first output data associated with a first point corresponding to a feature of the one or more features; and second output data associated with a second point corresponding to the feature.

O: The system of paragraph N, wherein the one or more processors are further to determine one or more locations associated with the one or more features within the environment, at least, by: determining, based at least on the first output data, a first location associated with the first point within the environment; determining, based at least on the second output data, a second location associated with the second point within the environment; and determining a connection between the second point and the first point.

P: The system of paragraph O, wherein the one or more processors are further to: determine, based at least on the one or more first tokens, that the first point includes a starting point associated with the feature; and determine, based at least on the one or more second tokens, that the second point includes at least one of an intermediary point or an ending point associated with the feature, wherein the determination of the connection between the second point and the first point is based at least on the first point including the starting point and the second point including the at least one of the intermediary point or the ending point.

Q: The system of any one of paragraphs J-P, wherein the one or more representations comprises one or more of: an intensity image corresponding to the environment; a color image corresponding to the environment; a height image corresponding to the environment; or a point cloud corresponding to the environment.

R: The system of any one of paragraphs J-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: A processor comprising: one or more processors to perform one or more operations based at least on one or more attributes associated with one or more surface lines within an environment, wherein the one or more attributes are determined based at least on one or more first tokens output using one or more language models that process one or more second tokens associated with the one or more surface lines as identified using one or more images.

T: The processor of paragraph S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

generating, based at least on one or more machine learning models processing at least a representations corresponding to an environment, one or more input tokens representative of a feature located within the environment;

generating, based at least on one or more language models processing the one or more input tokens, at least one or more first output tokens representative of a first location of a first point associated with the feature and one or more second output tokens representative of a second location of a second point associated with the feature;

determining, based at least on the one or more first output tokens and the one or more second output tokens, at least the first location of the first point within the representation and the second location of the second point within the representation;

determining, based at least on the first location and the second location, information associated with the feature within the environment by at least connecting the second point to the first point; and causing a map to be updated to indicate at least the information associated with the feature.

2. The method of claim 1, wherein:

the feature includes a surface line represented by the representation;

the one or more input tokens are representative of the surface line as represented by the representation; and the first point and the second point are associated with the surface line within the representation.

3. The method of claim 1, further comprising determining, based at least on the one or more first output tokens, at least one of:

one or more classes associated with the first point;

one or more types associated with the first point;

one or more colors associated with the first point; or one or more shapes associated with the first point.

4. The method of claim 1, wherein:

the first location includes first coordinates of the first point associated with the feature and within the representation; and the second location includes second coordinates of the second point associated with the feature and within the representation.

5. The method of claim 1, further comprising:

determining, based at least on the one or more first output tokens, that the first point includes a starting point associated with the feature; and determining, based at least on the one or more second output tokens, that the second point includes at least one of an intermediary point or an ending point associated with the feature, wherein the connecting the second point to the first point is further based at least on the first point including the starting point and the second point including the at least one of the intermediary point or the ending point.

6. The method of claim 1, wherein the generating the one or more input tokens comprises:

generating, based at least on the one or more machine learning models processing the representation, at least one of feature data associated with the representation or heatmap data associated with the representation; and generating, based at least on the at least one of the feature data or the heatmap data, the one or more input tokens representative of the feature located within the environment.

7. The method of claim 1, wherein the one or more representations comprises one or more of:

an intensity image corresponding to the environment;

a color image corresponding to the environment;

a height image corresponding to the environment; or a point cloud corresponding to the environment.

8. A system comprising:

one or more processors to:

generate one or more input tokens representing a feature located within an environment as represented by one or more representations;

generate, based at least on one or more language models processing the one or more input tokens, sets of tokens associated with points corresponding to the feature, an individual set of tokens from the sets of tokens representing at least one or more attributes associated with an individual point from the points;

generate, based at least on the sets of tokens, information associated with the feature; and perform one or more operations based at least on the information.

9. The system of claim 8, wherein the one or more processors are further to:

generate, based at least on sensor data, the one or more representations of the feature located within the environment, wherein the one or more input tokens are generated based at least on one or more machine learning models processing the one or more representations.

10. The system of claim 8, wherein:

the feature includes a traffic feature represented by the one or more representations; and the one or more input tokens represent at least the traffic feature as represented by the one or more representations.

11. The system of claim 8, wherein the one or more attributes include at least one of:

one or more classes associated with the individual point;

a location associated with the individual point;

one or more types associated with the feature;

one or more colors associated with the feature; or one or more shapes associated with the feature.

12. The system of claim 8, wherein:

associated with a first set of tokens from the sets of tokens represents at least a first location of a first point from the points corresponding to the feature; and a second set of tokens from the sets of tokens represents a second location of a second point from the points corresponding to the feature.

13. The system of claim 12, wherein the information is generated, at least, by:

determining, based at least on a first set of tokens of the sets of tokens, a first location associated with a first point from the points within the environment;

determining, based at least on a second set of tokens from the sets of tokens, a second location associated with a second point from the points within the environment; and determining the information by connecting the second point to the first point.

14. The system of claim 13, wherein the one or more processors are further to:

determine, based at least on the first set of tokens, that the first point includes a starting point associated with the feature; and determine, based at least on the second set of tokens, that the second point includes at least one of an intermediary point or an ending point associated with the feature, wherein the connecting the second point to the first point is based at least on the first point including the starting point and the second point including the at least one of the intermediary point or the ending point.

15. The system of claim 8, wherein the one or more representations comprises one or more of:

an intensity image corresponding to the environment;

a color image corresponding to the environment;

a height image corresponding to the environment; or a point cloud corresponding to the environment.

16. The system of claim 8, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

17. One or more processors comprising processing circuitry to:

generate, based at least on one or more representations corresponding to an environment, one or more inputs representative of a feature located within the environment;

generate, based at least on one or more language models processing the one or more inputs, at least one or more first outputs representative of a first location of a first point associated with the feature and one or more second outputs representative of a second location of a second point associated with the feature;

determine, based at least on the one or more first outputs and the one or more second outputs, information associated with the feature by at least connecting the second location of the second point to the first location of the first point; and perform one or more operations based at least on the information associated with the feature.

18. The one or more processors of claim 17, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

54 a system for performing operations using one or more large language models (LLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

19. The method of claim 1, wherein the determining the information associated with the feature within the environment comprises determining, based at least on connecting the first point to the second point, a shape associated with the feature, the information including at least the shape.

20. The method of claim 1, wherein the one or more language models are trained using at least:

one or more training input tokens representing one or more features located within one or more training representations; and ground truth data representing one or more locations of one or more points of the one or more features within the one or more training representations.

* * * * *